US011483477B2

(12) United States Patent
Tanaka et al.

(10) Patent No.: US 11,483,477 B2
(45) Date of Patent: *Oct. 25, 2022

(54) IMAGE BLUR CORRECTION DEVICE, IMAGING APPARATUS, IMAGE BLUR CORRECTION METHOD, AND IMAGE BLUR CORRECTION PROGRAM

(71) Applicant: FUJIFILM Corporation, Tokyo (JP)

(72) Inventors: Koichi Tanaka, Saitama (JP); Fuminori Irie, Saitama (JP); Junya Kitagawa, Saitama (JP); Kouhei Awazu, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/401,147

(22) Filed: Aug. 12, 2021

(65) Prior Publication Data

US 2021/0377444 A1 Dec. 2, 2021

Related U.S. Application Data

(63) Continuation of application No. 17/133,532, filed on Dec. 23, 2020, now Pat. No. 11,128,801, which is a
(Continued)

(30) Foreign Application Priority Data

Jun. 27, 2018 (JP) .............................. JP2018-122367

(51) Int. Cl.
*H04N 5/232* (2006.01)

(52) U.S. Cl.
CPC ..... *H04N 5/23258* (2013.01); *H04N 5/23245* (2013.01); *H04N 5/23287* (2013.01); *H04N 5/232933* (2018.08)

(58) Field of Classification Search
CPC ...... H04N 5/2328–23287; G02B 27/64; G02B 27/646; G03B 5/00; G03B 5/02; G03B 5/06; G03B 5/08; G03B 2205/00–0038
See application file for complete search history.

(56) References Cited

U.S. PATENT DOCUMENTS

| 2012/0093493 A1 | 4/2012 | Wakamatsu |
| 2012/0315025 A1* | 12/2012 | Wakamatsu ....... H04N 5/23261 396/55 |
| 2014/0327789 A1 | 11/2014 | Tsuchiya et al. |

FOREIGN PATENT DOCUMENTS

| JP | 2010-091672 A | 4/2010 |
| JP | 2012-088466 A | 5/2012 |

(Continued)

OTHER PUBLICATIONS

International Search Report issued in PCT/JP2019/021624; dated Aug. 13, 2019.
(Continued)

*Primary Examiner* — Paul M Berardesca
(74) *Attorney, Agent, or Firm* — Studebaker & Brackett PC

(57) ABSTRACT

The image blur correction device includes an acceleration sensor, an angular velocity sensor, and a system control unit. The system control unit selects one of rotation axes based on a usage state of a digital camera, and calculates a shift blur amount generated in a direction by rotation of the digital camera around a second axis and a shift blur amount generated in a direction by rotation of the digital camera around a first axis based on distances from the selected rotation axis to the acceleration sensor, angular velocities, and accelerations.

24 Claims, 16 Drawing Sheets

Related U.S. Application Data continuation of application No. PCT/JP2019/021624, filed on May 30, 2019.

(56) References Cited

FOREIGN PATENT DOCUMENTS

| | | |
|---|---|---|
| JP | 2012-247544 A | 12/2012 |
| JP | 2013-148717 A | 8/2013 |

OTHER PUBLICATIONS

Written Opinion issued in PCT/JP2019/021624; dated Aug. 13, 2019.

* cited by examiner

IMAGE BLUR CORRECTION DEVICE, IMAGING APPARATUS, IMAGE BLUR CORRECTION METHOD, AND IMAGE BLUR CORRECTION PROGRAM

CROSS REFERENCE TO RELATED APPLICATION

This application is a continuation of U.S. patent application Ser. No. 17/133,532 filed on Dec. 23, 2020, which is a continuation of International Application No. PCT/JP2019/021624 filed on May 30, 2019, which claims priority from Japanese Patent Application No. 2018-122367 filed on Jun. 27, 2018, the entire disclosures of which are incorporated herein by reference.

BACKGROUND OF THE INVENTION

1. Field of the Invention

The present invention relates to an image blur correction device, an imaging apparatus, an image blur correction method, and a computer readable medium storing an image blur correction program.

2. Description of the Related Art

An imaging apparatus comprising an imaging element for imaging a subject through an imaging optical system has an image blur correction function of correcting a blur (hereinafter, also referred to as an image blur) of a captured image signal caused by vibration of the apparatus. The image blur includes a shift blur, and a rotation blur.

The shift blur is a blur of the captured image signal in a direction along each of two orthogonal sides of a light receiving surface of the imaging element, and includes a blur (hereinafter, referred to as a translation blur) of the captured image signal caused by a translational motion of the apparatus and a blur (hereinafter, referred to as an angular blur) of the captured image signal caused by rotations (referred to as a pitch rotation and a yaw rotation) of the apparatus around two rotation axes which are perpendicular to an optical axis of the imaging optical system and are orthogonal to each other.

The rotation blur is a blur of the captured image signal caused by rotation (also referred to as a roll rotation) of the apparatus around a rotation axis parallel to the optical axis of the imaging optical system.

JP2012-088466A and JP2012-247544A describe cameras capable of correcting the angular blur.

SUMMARY OF THE INVENTION

In a case where a distance from a rotation center during the pitch rotation of the imaging apparatus to a principal point position of the imaging optical system is a radius of gyration $Ly$ and a rotation angle during the pitch rotation of the imaging apparatus is $\theta y$, a shift blur $Sy$ caused by the pitch rotation can be obtained by the calculation of $Sy = Ly \cdot \tan \theta y$.

Similarly, in a case where a distance from a rotation center during the yaw rotation of the imaging apparatus to a principal point position of the imaging optical system is a radius of gyration $Lx$ and a rotation angle during the yaw rotation of the imaging apparatus is $\theta x$, a shift blur $Sx$ caused by the yaw rotation can be obtained by the calculation of $Sx = Lx \cdot \tan \theta x$.

An angular velocity sensor is provided in the imaging apparatus, and the rotation angle $\theta x$ and the rotation angle $\theta y$ can be obtained based on angular velocities detected by the angular velocity sensor.

The radius of gyration $Lx$ and the radius of gyration $Ly$ can be obtained based on accelerations generated by the yaw rotation and the pitch rotation of the imaging apparatus and the angular velocities detected by the angular velocity sensor.

However, in a case where it is assumed that the imaging apparatus yaw-rotates or pitch-rotates and roll-rotates at the same time, an acceleration sensor detects the acceleration caused by the roll rotation of the imaging apparatus in addition to the acceleration caused by the yaw rotation or pitch rotation of the imaging apparatus. In a case where the acceleration caused by the roll rotation is detected as described above, an error may be generated between the radius of gyration $Lx$ and the radius of gyration $Ly$ calculated based on the acceleration, and there is a possibility that correction accuracy of the shift blur degrades.

In a case where a position of the rotation center the roll rotation of the imaging apparatus is predetermined, it is possible to accurately correct the shift blur by using the radius of gyration having no error by arranging the acceleration sensor such that an error is not generated in either the radius of gyration $Lx$ or the radius of gyration $Ly$. However, in an actual usage scene, the position of this rotation center may change rather than being constant. JP2012-088466A and JP2012-247544A do not consider such a change in the position of the rotation center.

The present invention has been made in view of the above circumstances, and an object of the present invention is to provide an image blur correction device capable of correcting a blur of a captured image signal caused by a pitch rotation and a yaw rotation of an imaging apparatus with high accuracy, an imaging apparatus comprising the image blur correction device, an image blur correction method, and a computer readable medium storing an image blur correction program.

An image blur correction device according to an embodiment of the present invention is an image blur correction device configured to correct a blur of a captured image signal output from an image sensor which images a subject through an imaging optical system. The device comprises an acceleration sensor that detects a first acceleration in one direction of two directions which are orthogonal to an optical axis of the imaging optical system of an imaging apparatus including the image sensor and are orthogonal to each other and a second acceleration in the other direction of the two directions, an angular velocity sensor that detects a first angular velocity of the imaging apparatus around a first axis parallel to the other direction and a second angular velocity of the imaging apparatus around a second axis parallel to the one direction, a radius-of-gyration calculator that calculates a first radius of gyration of the imaging apparatus around the first axis based on the first acceleration and the first angular velocity and a second radius of gyration of the imaging apparatus around the second axis based on the second acceleration and the second angular velocity, and a corrector that calculates a first blur amount of the captured image signal in the one direction generated by rotation of the imaging apparatus around the first axis based on the first angular velocity and at least one of the first radius of gyration or the second radius of gyration, calculates a second blur amount of the captured image signal in the other direction generated by rotation of the imaging apparatus around the second axis based on the second angular velocity and at least one of the first radius of gyration or the second radius of gyration, and corrects the calculated first blur amount and the calculated second blur amount. The corrector selects one rotation axis from among a plurality of rotation axes determined in advance parallel to the optical axis based on a usage state of the imaging apparatus, and determines the first radius of gyration and the second radius of gyration used in calculating the first blur amount and the second blur amount based on distances in the two directions from the selected rotation axis to the acceleration sensor.

An imaging apparatus according to an embodiment of the present invention comprises the image blur correction device and the image sensor.

An image blur correction method according to an embodiment of the present invention is an image blur correction method of correcting a blur of a captured image signal output from an image sensor which images a subject through an imaging optical system. The method comprises a radius-of-gyration calculation step of calculating a first radius of gyration of an imaging apparatus around a first axis based on a first acceleration and a first angular velocity detected by an acceleration sensor that detects the first acceleration in one direction of two directions which are orthogonal to an optical axis of the imaging optical system of the imaging apparatus including the image sensor and are orthogonal to each other and a second acceleration in the other direction of the two directions and an angular velocity sensor that detects the first angular velocity of the imaging apparatus around the first axis parallel to the other direction and a second angular velocity of the imaging apparatus around a second axis parallel to the one direction, and calculating a second radius of gyration of the imaging apparatus around the second axis based on the second acceleration and the second angular velocity, and a correction step of calculating a first blur amount of the captured image signal in the one direction generated by rotation of the imaging apparatus around the first axis based on the first angular velocity and at least one of the first radius of gyration or the second radius of gyration, calculating a second blur amount of the captured image signal in the other direction generated by rotation of the imaging apparatus around the second axis based on the second angular velocity and at least one of the first radius of gyration or the second radius of gyration, and correcting the calculated first blur amount and the calculated second blur amount. In the correction step, one rotation axis is selected from among a plurality of rotation axes determined in advance parallel to the optical axis based on a usage state of the imaging apparatus, and the first radius of gyration and the second radius of gyration used in calculating the first blur amount and the second blur amount is determined based on distances in the two directions from the selected rotation axis to the acceleration sensor.

A non-transitory computer readable medium storing an image blur correction program according to an embodiment of the present invention is an image blur correction program for correcting a blur of a captured image signal output from an image sensor which images a subject through an imaging optical system. The program causes a computer to execute a radius-of-gyration calculation step of calculating a first radius of gyration of an imaging apparatus around a first axis based on a first acceleration and a first angular velocity detected by an acceleration sensor that detects the first acceleration in one direction of two directions which are orthogonal to an optical axis of the imaging optical system of the imaging apparatus including the image sensor and are orthogonal to each other and a second acceleration in the other direction of the two directions and an angular velocity sensor that detects the first angular velocity of the imaging apparatus around the first axis parallel to the other direction and a second angular velocity of the imaging apparatus around a second axis parallel to the one direction, and calculating a second radius of gyration of the imaging apparatus around the second axis based on the second acceleration and the second angular velocity, and a correction step of calculating a first blur amount of the captured image signal in the one direction generated by rotation of the imaging apparatus around the first axis based on the first angular velocity and at least one of the first radius of gyration or the second radius of gyration, calculating a second blur amount of the captured image signal in the other direction generated by rotation of the imaging apparatus around the second axis based on the second angular velocity and at least one of the first radius of gyration or the second radius of gyration, and correcting the calculated first blur amount and the calculated second blur amount. In the correction step, one rotation axis is selected from among a plurality of rotation axes determined in advance parallel to the optical axis based on a usage state of the imaging apparatus, and the first radius of gyration and the second radius of gyration used in calculating the first blur amount and the second blur amount is determined based on distances in the two directions from the selected rotation axis to the acceleration sensor.

According to the present invention, it is possible to provide an image blur correction device capable of correcting a blur of a captured image signal caused by a pitch rotation and a yaw rotation of an imaging apparatus with high accuracy, an imaging apparatus comprising the image blur correction device, an image blur correction method, and an image blur correction program.

DESCRIPTION OF THE PREFERRED EMBODIMENTS

Hereinafter, an embodiment of the present invention will be described with reference to the drawings.

Figure 1:
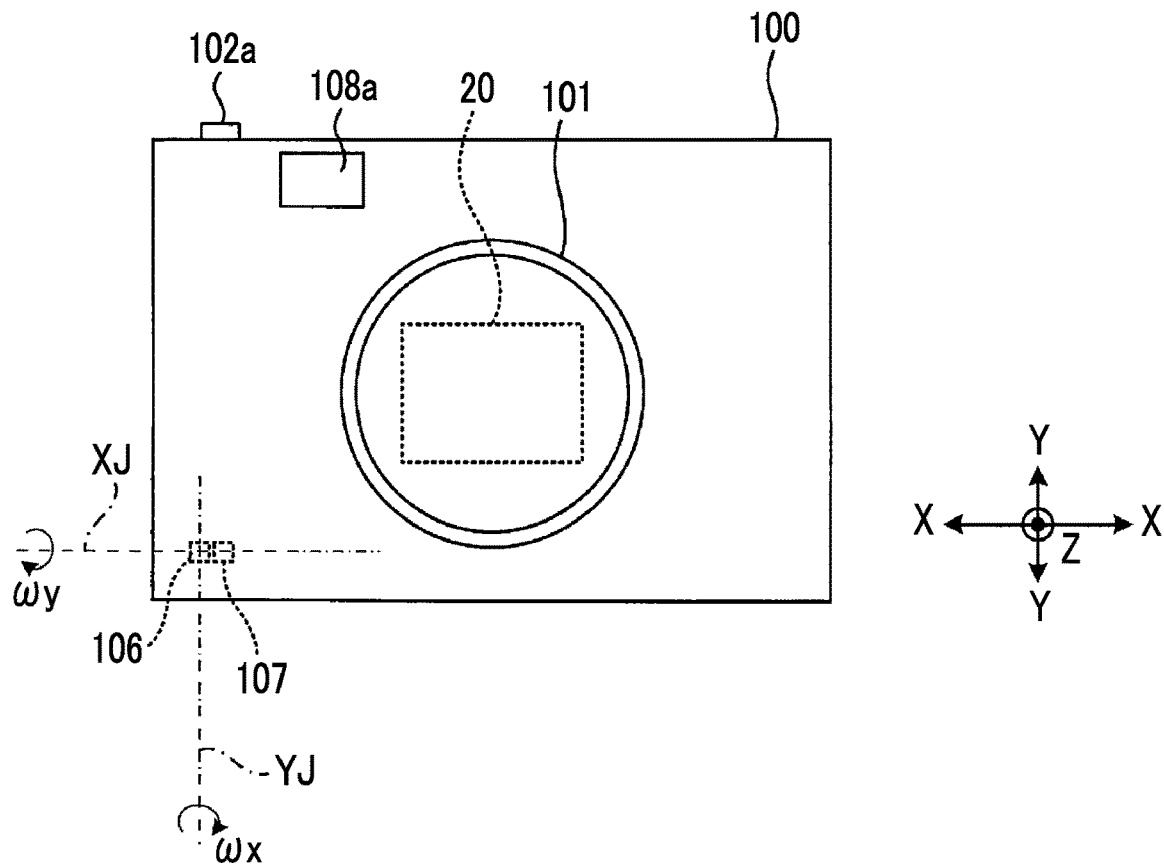
FIG. 1 is a front view showing a schematic configuration of a digital camera 100 which is an embodiment of an imaging apparatus of the present invention.
Figure 2:
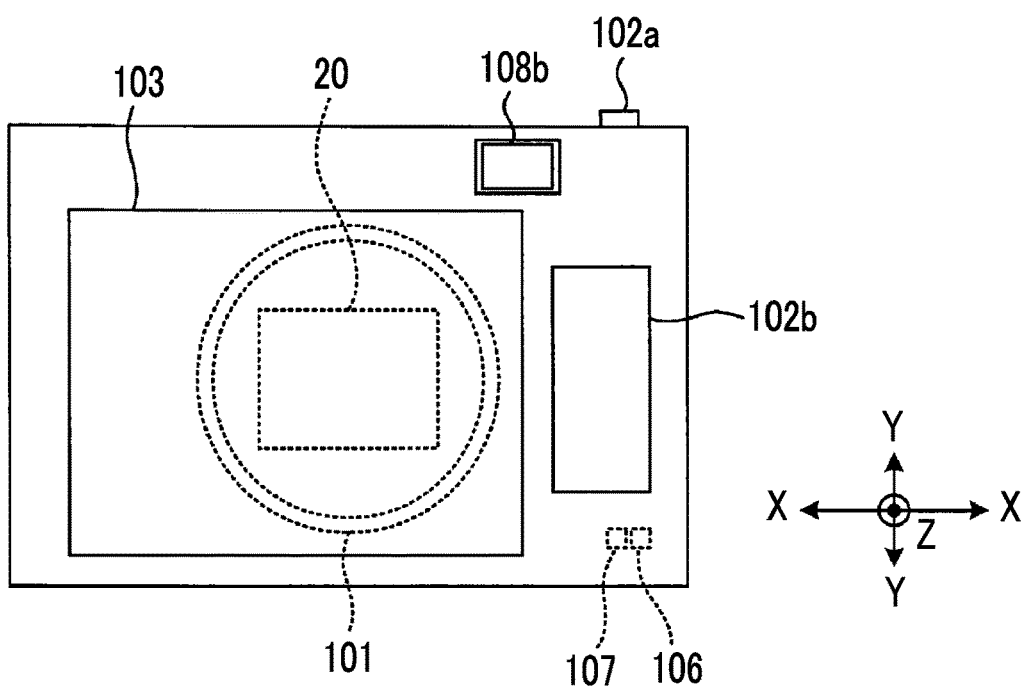
FIG. 2 is a rear view showing a schematic configuration of the digital camera 100 shown in FIG. 1.
Figure 3:
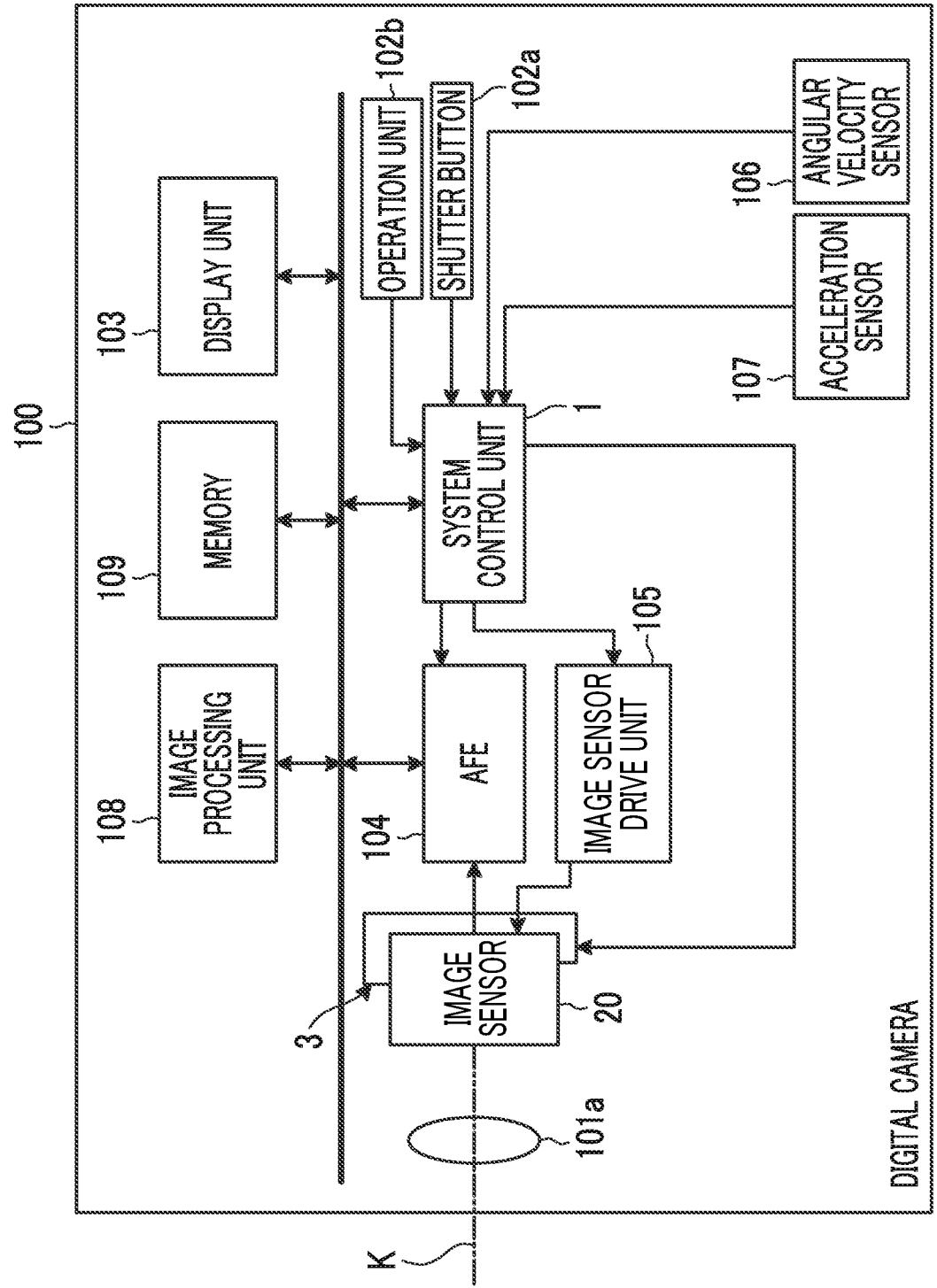
FIG. 3 is a block diagram showing a hardware configuration of the digital camera 100 shown in FIG. 1.

FIG. 1 is a front view showing a schematic configuration of a digital camera 100 which is an embodiment of an imaging apparatus of the present invention. FIG. 2 is a rear view showing the schematic configuration of the digital camera 100 shown in FIG. 1. FIG. 3 is a block diagram showing a hardware configuration of the digital camera 100 shown in FIG. 1.

The digital camera 100 comprises a lens barrel 101 and a finder window 108a (see FIG. 1) provided on a front surface of a housing, a shutter button 102a (see FIGS. 1 and 2) provided on a side surface of the housing, a display unit 103, an eyepiece window 108b, and an operation unit 102b (see FIG. 2) provided on a back surface of the housing, an image sensor 20 provided in the housing, an image blur correction mechanism 3, an analog front end (AFE) 104, an image sensor drive unit 105, an angular velocity sensor 106, an acceleration sensor 107, an image processing unit 108, a memory 109, and a system control unit 1.

The lens barrel 101 has an imaging optical system 101a therein. The imaging optical system 101a includes at least an imaging lens such as a focus lens or a zoom lens. The imaging optical system 101a includes a stop mechanism, a mechanical shutter mechanism, or the like as necessary. The lens barrel 101 may be fixed to a main body of the digital camera 100 or may be attachable to and detachable from the main body of the digital camera 100.

The image sensor 20 images a subject through the imaging optical system 101a, and is a charge coupled device (CCD) image sensor, a complementary metal oxide semiconductor (CMOS) image sensor, or the like. As shown in FIGS. 1 and 2, a light receiving surface of the image sensor 20 has a rectangular shape.

The shutter button 102a is an operation member for instructing that the imaging of the subject using the image sensor 20 is started. In a case where the shutter button 102a is operated, an imaging instruction signal is input to the system control unit 1. In a case where the imaging instruction signal is received, the system control unit 1 controls the image sensor 20 to image the subject.

The operation unit 102b includes a jog dial, a cross key, or a button for performing various operations such as switching between a still image imaging mode for imaging a still image and a motion picture imaging mode for imaging a motion picture, setting an imaging condition, or selecting an imaging menu. In a case where the operation unit 102b is operated, various instruction signals are input to the system control unit 1.

The finder window 108a and the eyepiece window 108b constitute a part of an optical finder. In a case where a user looks through the eyepiece window 108b, the subject can be observed through the finder window 108a.

In the digital camera 100, an electronic viewfinder may be used instead of the optical finder. In this case, the finder window 108a is deleted, and an image on a display unit for observing the subject installed in the housing of the digital camera 100 can be viewed by looking through the eyepiece window 108b.

The digital camera 100 may have a hybrid finder having both functions of the optical finder and the electronic viewfinder. In any of the finders, the eyepiece window 108b for the user to observe the subject is provided on the back surface of the housing of the digital camera 100.

The display unit 103 is a liquid crystal display (LCD), an organic electro luminescence (EL) display, or the like. In the digital camera 100, in a case where an imaging mode for imaging the subject is set, a live view image is displayed on the display unit 103. Accordingly, the subject can be observed not only by the finder described above but also by the display unit 103.

The image blur correction mechanism 3 images the subject by the image sensor 20 and corrects a blur of a captured image signal output from the image sensor 20 by moving the light receiving surface of the image sensor 20 into a plane perpendicular to an optical axis K of the imaging optical system 101a.

In the digital camera 100, a state in which the light receiving surface of the image sensor 20 is perpendicular to a vertical direction (a state in which the optical axis K is parallel to the vertical direction) and a state in which a center of the light receiving surface is located on the optical axis K are referred to as a reference state.

In the reference state, a longitudinal direction of the light receiving surface of the image sensor 20 is defined as a direction X, a lateral direction of the light receiving surface of the image sensor 20 is defined as a direction Y, and a direction orthogonal to the direction X and the direction Y (a direction in which an optical axis of the imaging optical system 101a extends) is defined as a direction Z (see FIGS. 1 and 2).

The image blur correction mechanism 3 corrects at least a shift blur of image blurs by moving the image sensor 20 in the directions X and Y. The shift blur includes a blur (angular blur) of the captured image signal caused by rotations of the apparatus around each of two rotation axes (an axis extending in the direction X and an axis extending in the direction Y) which are perpendicular to the optical axis K of the imaging optical system 101a and are orthogonal to each other (referred to as a pitch rotation and a yaw rotation) and a blur (a translation blur) of the captured image signal caused by movement of the apparatus in the direction X and the direction Y by the rotation thereof.

The acceleration sensor 107 detects at least an acceleration in each of the directions X and Y which are two directions orthogonal to the optical axis K of the imaging optical system 101a and orthogonal to each other. The direction X is one of the two directions. The direction Y is the other direction of these two directions. Examples of the acceleration sensor 107 include a three-axis acceleration sensor that detects an acceleration in each of the direction X, the direction Y, and the direction Z.

Hereinafter, the acceleration in the direction X detected by the acceleration sensor 107 is referred to as a first acceleration Atx, and the acceleration in the direction Y detected by the acceleration sensor 107 is referred to as a second acceleration Aty. The accelerations detected by the acceleration sensor 107 are input to the system control unit 1.

As shown in FIG. 1, the angular velocity sensor 106 detects at least a first angular velocity ωx around a first axis YJ parallel to the direction Y and a second angular velocity ωy around a second axis XJ parallel to the direction X. The angular velocities detected by the angular velocity sensor 106 are input to the system control unit 1. Examples of the angular velocity sensor 106 include a three-axis angular velocity sensor that detects an angular velocity around an axis parallel to the direction X, an angular velocity around an axis parallel to the direction Y, and an angular velocity around an axis parallel to the direction Z.

The AFE 104 shown in FIG. 3 includes a signal processing circuit that performs Sampling two correlation pile processing, digital conversion processing, and the like on the captured image signal output from the image sensor 20.

The image processing unit 108 shown in FIG. 3 generates captured image data in a Joint Photographic Experts Group (JPEG) format or the like by performing digital signal processing on the captured image signal processed by the AFE 104.

The system control unit 1 shown in FIG. 3 controls the image sensor drive unit 105 and the AFE 104 to cause the image sensor 20 to image the subject and output the captured image signal corresponding to a subject image from the image sensor 20. The system control unit 1 controls the image blur correction mechanism 3 based on motion information of the digital camera 100 detected by the acceleration sensor 107 and the angular velocity sensor 106. The system control unit 1 corrects the shift blur of the captured image signal output from the image sensor 20 by moving the light receiving surface of the image sensor 20 in at least one of the direction X or Y. The system control unit 1, the acceleration sensor 107, and the angular velocity sensor 106 constitute an image blur correction device.

The system control unit 1 controls the entire digital camera 100 as a whole, and is constituted by various processors that perform processing by executing a program including an image blur correction program.

A central processing unit (CPU) which is a general-purpose processor that performs various kinds of processing by executing a program, a programmable logic device (PLD) which is a processor capable of changing a circuit configuration after a field programmable gate array (FPGA) is manufactured, a dedicated electric circuit which is a processor having a circuit configuration specifically designed to execute specific processing such as an application specific integrated circuit (ASIC), or the like is included as various processors.

More specifically, structures of these various processors are electric circuits in which circuit elements such as semiconductor elements are combined.

The system control unit 1 may be constituted by one of various processors, or may be constituted by a combination of two or more processors of the same type or different types (for example, a combination of a plurality of FPGAs or a combination of a CPU and an FPGA).

The memory 109 includes a random access memory (RAM) and a read only memory (ROM). The ROM stores programs (including an image blur correction program) necessary for an operation of the system control unit 1 and various kinds of data.

Figure 4:
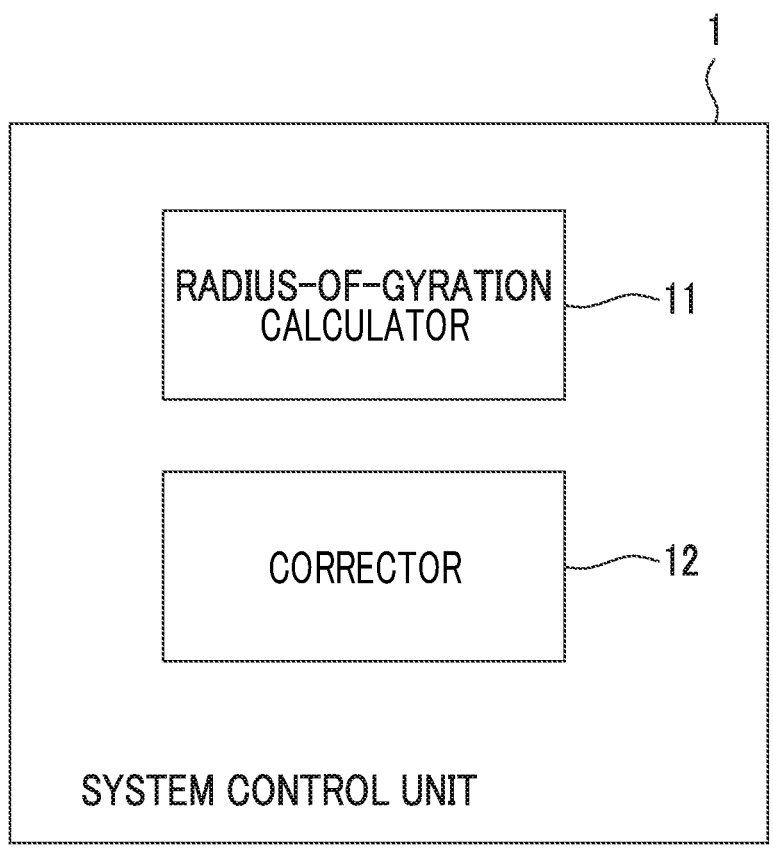
FIG. 4 is a functional block diagram of a system control unit 1 shown in FIG. 3.

FIG. 4 is a functional block diagram of the system control unit 1 shown in FIG. 3. The system control unit 1 functions as a radius-of-gyration calculator 11 and a corrector 12 by executing a program including the image blur correction program stored in the ROM of the memory 109.

The radius-of-gyration calculator 11 calculates a first radius of gyration Lx in a case where the digital camera 100 rotates around the first axis YJ (yaw rotation) based on the first acceleration Atx and the first angular velocity ωx, and calculates a second radius of gyration Ly in a case where the digital camera 100 rotates around the second axis XJ (pitch rotation) based on the second acceleration Aty and the second angular velocity ωy.

Figure 5:
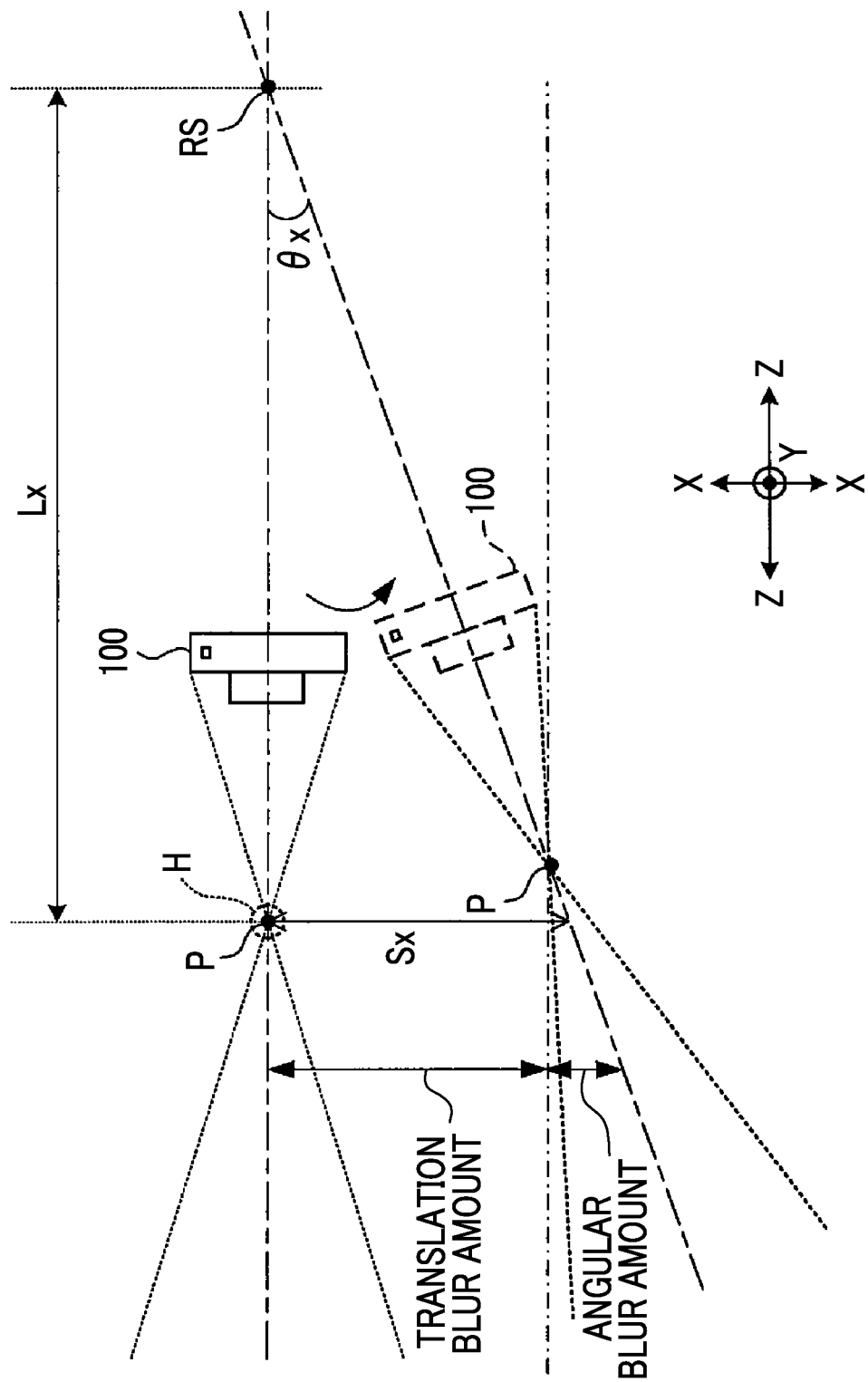
FIG. 5 is a schematic diagram for describing a method of calculating a shift blur amount of a captured image signal generated by a yaw rotation of the digital camera 100 around a first axis YJ.

FIG. 5 is a schematic diagram for describing a method of calculating a shift blur amount of the captured image signal caused by the rotation of the digital camera 100 around the first axis YJ. FIG. 5 shows a state in which the digital camera 100 is viewed from the direction Y.

As shown in FIG. 5, in a case where the digital camera 100 yaw-rotates around the first axis YJ by a rotation angle θx and moves to a position indicated by a broken line, the first radius of gyration Lx in a case where the digital camera 100 yaw-rotates can be calculated by the following Equation (A).

$$Lx = Vx/\omega x \tag{A}$$

In Equation (A), "Vx" is a velocity obtained by integrating the first acceleration Atx in the direction X generated by the yaw rotation. The first radius of gyration Lx is defined by a distance in the direction Z between a rotation center RS in a case where the digital camera 100 yaw-rotates and a principal point position P of the imaging optical system 101*a* of the digital camera 100.

As shown in FIG. 5, in a case where the digital camera 100 yaw-rotates, a subject H present on the optical axis before the yaw rotation is present at a position separated from the optical axis in the direction X by Sx after the yaw rotation. This Sx is a shift blur amount (first blur amount) of the captured image signal generated in the direction X due to the yaw rotation. The shift blur amount Sx can be calculated by the calculation of the following Equation (B).

$$Sx = Lx \cdot \tan \theta x \tag{B}$$

The rotation angle θx shown in FIG. 5 can be obtained by integrating the first angular velocity ωx detected by the angular velocity sensor 106.

Figure 6:
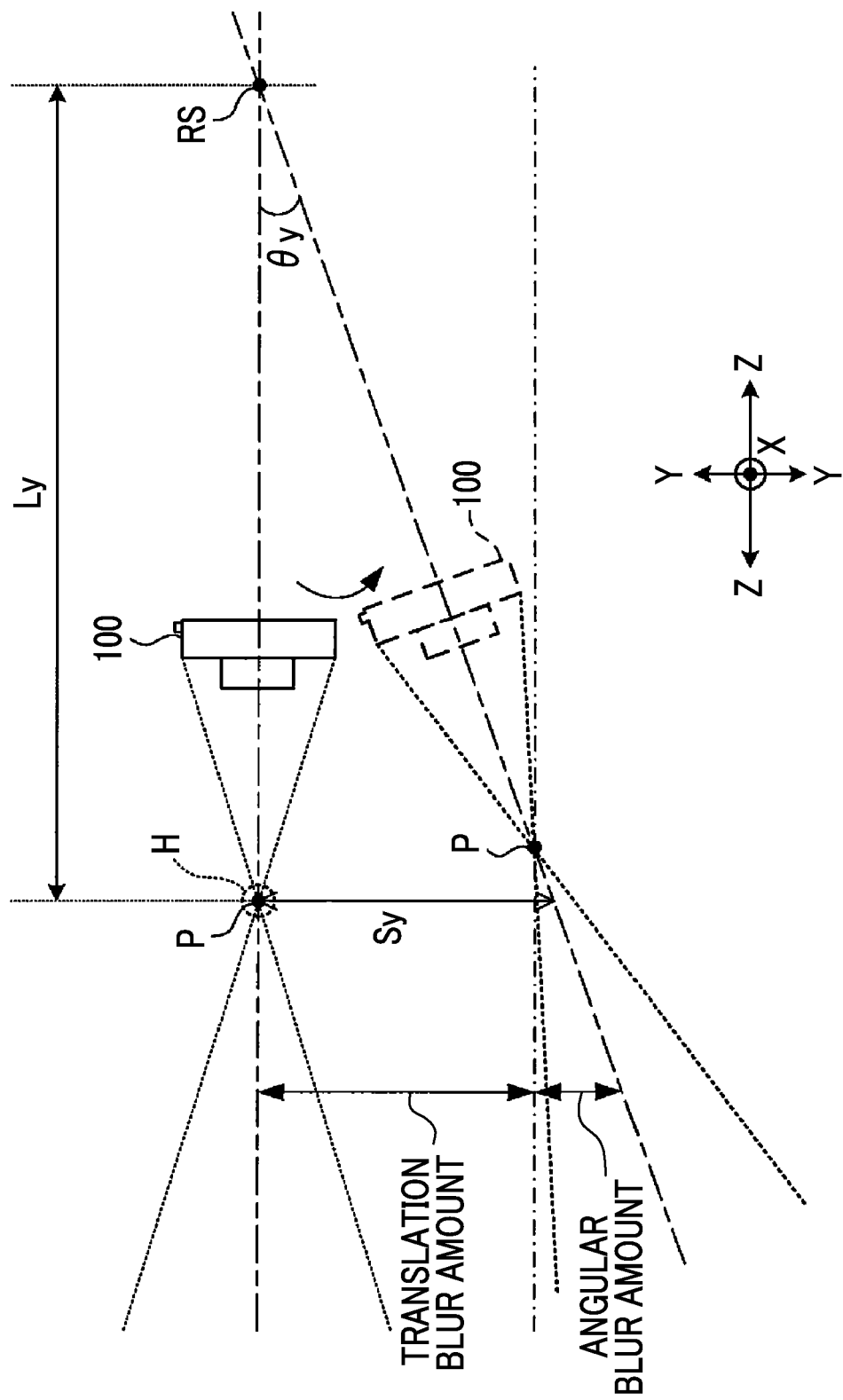
FIG. 6 is a schematic diagram for describing a method of calculating a shift blur amount of the captured image signal generated by a rotation of the digital camera 100 around a second axis XJ.

FIG. 6 is a schematic diagram for describing a method of calculating a shift blur amount of the captured image signal generated by the rotation of the digital camera 100 around the second axis XJ. FIG. 6 shows a state in which the digital camera 100 is viewed from the direction X. As shown in FIG. 6, in a case where the digital camera 100 pitch-rotates around the second axis XJ by the rotation angle θy and moves to a position indicated by a broken line, the second radius of gyration Ly in a case where the digital camera 100 pitch-rotates can be calculated by the following Equation (C).

$$Ly = Vy/\omega y \tag{C}$$

In Equation (C), "Vy" is a velocity obtained by integrating the second acceleration Aty in the direction Y generated by the pitch rotation. The second radius of gyration Ly is defined by a distance in the direction Z between the rotation center RS in a case where the digital camera 100 pitch-rotates and the principal point position P of the imaging optical system 101a of the digital camera 100.

As shown in FIG. 6, in a case where the digital camera 100 pitch-rotates, the subject H present on the optical axis before the pitch rotation is present at a position separated from the optical axis by Sy in the direction Y after the pitch rotation. This Sy is a shift blur amount (second blur amount) of the captured image signal generated in the direction Y due to the pitch rotation. The shift blur amount Sy can be calculated by the calculation of the following Equation (D).

$$Sy = Ly \cdot \tan \theta y \quad (D)$$

The rotation angle θy shown in FIG. 6 can be obtained by integrating the second angular velocity ωy detected by the angular velocity sensor 106.

As described above, the shift blur amount Sx generated by the yaw rotation of the digital camera 100 can be calculated based on the first angular velocity ωx and the first radius of gyration Lx, and the first radius of gyration Lx can be calculated based on the first acceleration Atx.

The shift blur amount Sy generated by the pitch rotation of the digital camera 100 can be calculated based on the second angular velocity ωy and the second radius of gyration Ly, and the second radius of gyration Ly can be calculated based on the second acceleration Aty.

In a case where general imaging is assumed, it is difficult to consider that a large difference is generated between the first radius of gyration Lx and the second radius of gyration Ly. However, in a case where it is considered that the digital camera 100 yaw-rotates or pitch-rotates and roll rotation at the same time, the acceleration sensor 107 detects, an error, the acceleration caused by the roll rotation of the digital camera 100 (rotational acceleration component) in addition to the acceleration due to the yaw rotation or pitch rotation of the digital camera 100. Due to the influence of this error, there is a possibility that a difference in accuracy between the first radius of gyration Lx and the second radius of gyration Ly obtained from the acceleration.

Although a relationship between the rotational acceleration component included in the first acceleration Atx and the rotational acceleration component included in the second acceleration Aty is determined by a positional relationship between the acceleration sensor 107 and the rotation center (rotation axis) in a case where the digital camera 100 roll-rotates, this rotation axis may change depending on the usage state of the digital camera 100.

Figure 7:
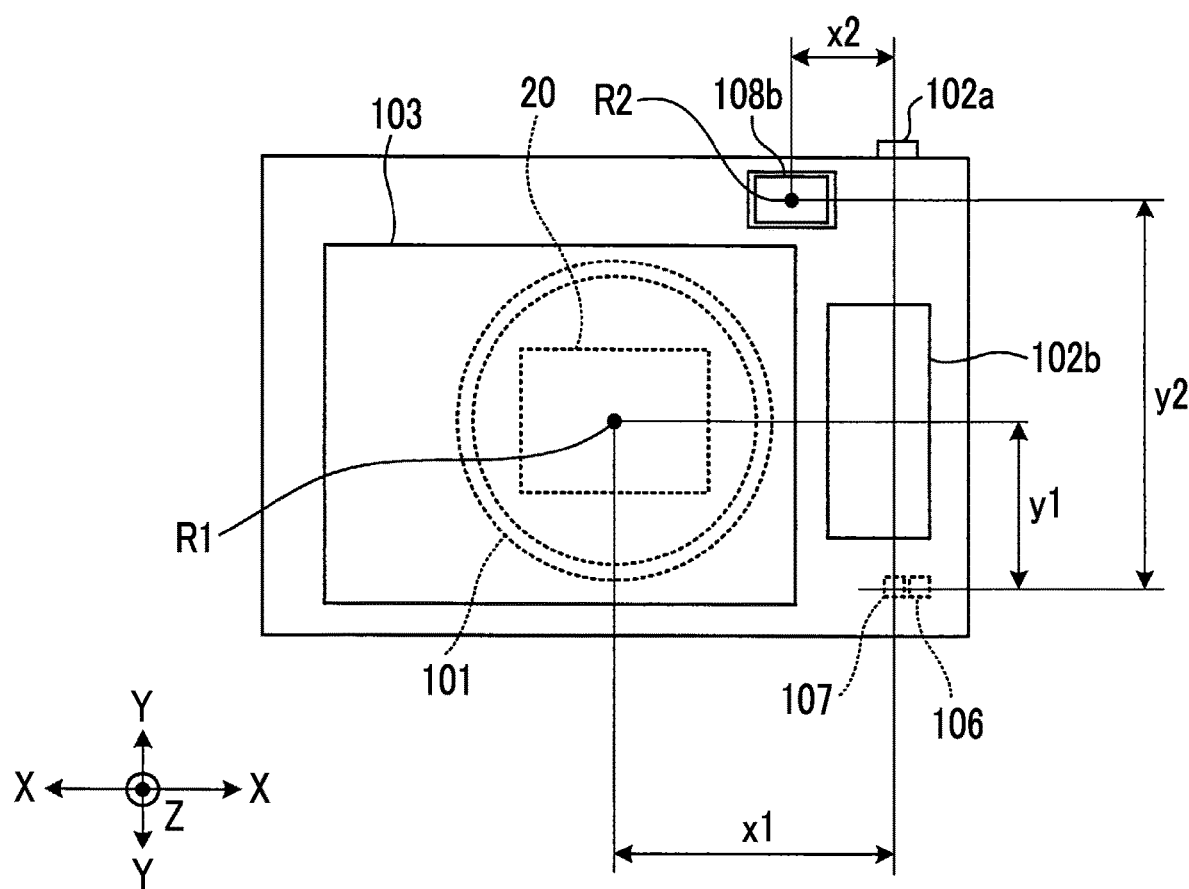
FIG. 7 is a diagram showing a setting example of a rotation axis in the digital camera 100 shown in FIG. 1.

In the digital camera 100, a rotation axis R1 and a rotation axis R2 are set in advance as rotation axes in a case where the digital camera 100 roll-rotates as shown in FIG. 7.

The rotation axis R1 is an axis extending in the direction Z and set at the same position as the optical axis K of the imaging optical system 101a. The rotation axis R2 is an axis extending in the direction Z and set at a position of the eyepiece window 108b. A position of the rotation axis R2 is set at a center of the eyepiece window 108b in the example of FIG. 7, but this position may be any position in a range in which the rotation axis overlaps the eyepiece window 108b.

It is assumed that the user of the digital camera 100 images the subject by pressing the shutter button 102a while viewing the live view image displayed on the display unit 103 and observing the subject. In this case, it is considered that a rotation center in a case where the digital camera 100 roll-rotates is substantially coincident with a position of the optical axis K of the imaging optical system 101a. Thus, the rotation axis R1 is set at the same position as the optical axis K of the imaging optical system 101a.

It is assumed that the user of the digital camera 100 images the subject by pressing the shutter button 102a while observing the subject with one eye on the eyepiece window 108b. In this case, it is considered that the rotation center in a case where the digital camera 100 roll-rotates is substantially coincident with the position of the eyepiece window 108b. Thus, the rotation axis R2 is set at the position of the eyepiece window 108b.

For example, it is assumed that the digital camera 100 roll-rotates around the rotation axis R1. In this case, a distance x1 between the rotation axis R1 and the acceleration sensor 107 in the direction X is greater than a distance y1 between the rotation axis R1 and the acceleration sensor 107 in the direction Y.

Thus, an error component of the acceleration generated in the direction X due to the roll rotation around the rotation axis R1 is less than an error component of the acceleration generated in the direction Y. That is, in this case, the first radius of gyration Lx becomes closer to an accurate value than the second radius of gyration Ly.

Meanwhile, it is assumed that the digital camera 100 roll-rotates around the rotation axis R2. In this case, a distance x2 between the rotation axis R2 and the acceleration sensor 107 in the direction X is less than a distance y2 between the rotation axis R2 and the acceleration sensor 107 in the direction Y.

Thus, the error component of the acceleration generated in the direction X due to the roll rotation around the rotation axis R2 is greater than the error component of the acceleration generated in the direction Y. That is, in this case, the second radius of gyration Ly becomes closer to a more accurate value than the first radius of gyration Lx.

For example, it is assumed that the acceleration sensor 107 is arranged such that the distance x1 and the distance y1 shown in FIG. 7 are the same. In this configuration, in a case where it is assumed that the digital camera 100 roll-rotates around the rotation axis R1, there is almost no difference in accuracy between the first radius of gyration Lx and the second radius of gyration Ly.

As described above, the difference in accuracy between the first radius of gyration Lx and the second radius of gyration Ly is generated depending on the positional relationship between the acceleration sensor 107 and the rotation axis in a case where the digital camera 100 roll-rotates. It is considered that the first radius of gyration Lx and the second radius of gyration Ly are the same in the general imaging.

That is, in the calculation of the shift blur amounts Sx and Sy described above, for example, the shift blur amounts Sx and Sy can be accurately calculated by using one of the first radius of gyration Lx and the second radius of gyration Ly which is considered to be more accurate even though there is an error in acceleration due to the roll rotation.

Due to the use of a more accurate radius of gyration, the corrector 12 shown in FIG. 4 calculates the shift blur amount Sx based on the first angular velocity ωx and at least one of the first radius of gyration Lx or the second radius of gyration Ly, and calculates the shift blur amount Sy based on the second angular velocity ωy and at least one of the first radius of gyration Lx or the second radius of gyration Ly.

The corrector 12 selects one of the rotation axes R1 and R2 shown in FIG. 7 based on the usage state of the digital camera 100, and determines the radius of gyration used in the calculation of the shift blur amount Sx and the shift blur amount Sy based on a first distance px in the direction X and a second distance py in the direction Y from the selected rotation axis R1 or rotation axis R2 to the acceleration sensor 107.

The corrector 12 corrects the shift blurs of the captured image signal in the directions X and Y by controlling the image blur correction mechanism 3 so as to cancel the shift blur amounts Sx and Sy calculated in this manner.

The rotation axis to be selected by the corrector 12 is determined in advance according to the usage state of the digital camera 100. The usage state indicates a state in which the digital camera 100 is used in a case where an imaging instruction to instruct that the imaging of the subject is started while the digital camera 100 is set in the imaging mode. In the digital camera 100, this usage state includes a usage state in which the subject is observed by using the eyepiece window 108b and a usage state in which the subject is observed without using the eyepiece window 108b.

Figure 8:
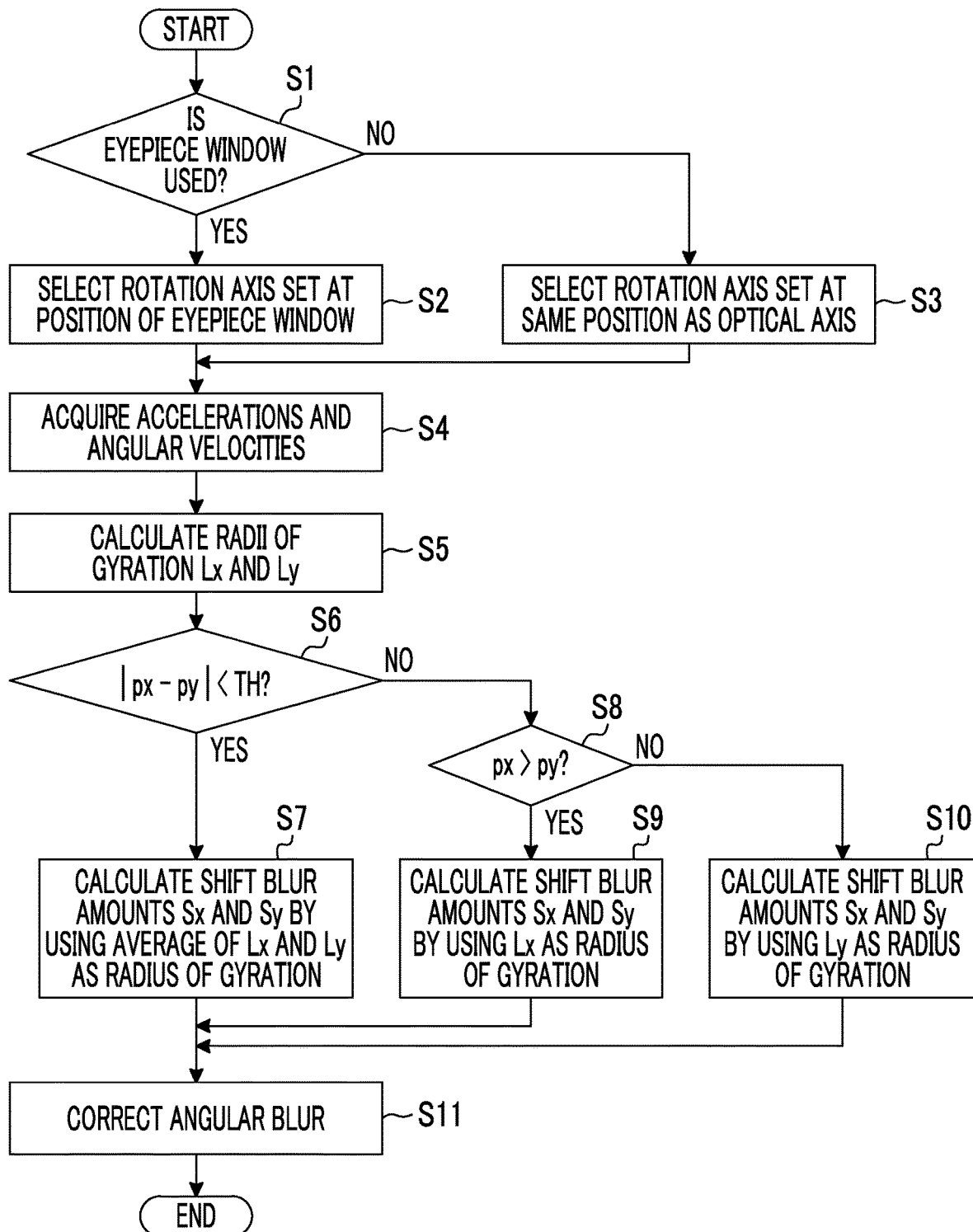
FIG. 8 is a flowchart for describing an operation of the digital camera 100 shown in FIG. 1 in a still image imaging mode.

FIG. 8 is a flowchart for describing an operation of the digital camera 100 shown in FIG. 1 in the still image imaging mode. The shutter button 102a is pressed in a state in which the still image imaging mode is set, the operation shown in FIG. 8 is started.

First, the corrector 12 of the system control unit 1 determines whether or not the subject is being observed by using the eyepiece window 108b (step S1).

For example, a contact sensor is provided at the eyepiece window 108b. In a case where the contact of an object is detected by the contact sensor, the corrector 12 determines that the subject is being observed by using the eyepiece window 108b. Meanwhile, in a case where the contact of the object is not detected by the contact sensor, the corrector 12 determines that the subject is observed without using the eyepiece window 108b.

In a case where the eyepiece window 108b of the digital camera 100 constitutes a part of the electronic viewfinder, a switch for turning on and off the function of the electronic viewfinder may be included in the operation unit 102b instead of the contact sensor.

The corrector 12 may determine that the subject is being observed by using the eyepiece window 108b in a case where the function of the electronic viewfinder is turned on by this switch, and may determine that the subject is being observed without using the eyepiece window 108b in a case where the function of the electronic viewfinder is turned off by this switch.

In a case where it is determined that the subject is being observed by using the eyepiece window 108b (step S1: YES), the corrector 12 selects the rotation axis R2 shown in FIG. 7 set at the position of the eyepiece window 108b (step S2).

In a case where it is determined that the subject is being observed without using the eyepiece window 108b (step S1: NO), the corrector 12 selects the rotation axis R1 shown in FIG. 5 set at the same position as the optical axis K (step S3).

After step S2 or step S3, the system control unit 1 acquires the first acceleration ATx and the second acceleration Aty from the acceleration sensor 107, and acquires the first angular velocity ωx and the second angular velocity ωy from the angular velocity sensor 106 (step S4).

Subsequently, the radius-of-gyration calculator 11 of the system control unit 1 calculates the first radius of gyration Lx by the calculation of Equation (A) based on the first acceleration Atx and the first angular velocity ωx acquired in step S4, and calculates the second radius of gyration Ly by the calculation of Equation (C) based on the second acceleration Aty and the second angular velocity ωy acquired in step S4 (step S5).

Subsequently, the corrector 12 calculates the difference between the first distance px in the direction X and the second distance py in the direction Y between the rotation axis selected in step S2 or step S3 and the acceleration sensor 107, and determines whether or not this difference is less than a predetermined threshold value TH (step S6). Information on the first distance px and the second distance py in the directions X and Y between the rotation axis R1 or R2 and the acceleration sensor 107 is stored in advance in the ROM of the memory 109.

In a case where it is determined that the difference is less than the threshold value TH (step S6: YES), the corrector 12 calculates the shift blur amounts Sx and Sy by using both the first radius of gyration Lx and the second radius of gyration Ly calculated in step S5.

Specifically, the corrector 12 calculates the shift blur amount Sx by substituting an average value of the first radius of gyration Lx and the second radius of gyration Ly calculated in step S5 into "Lx" in Equation (B). Similarly, the corrector 12 calculates the shift blur amount Sy by substituting an average value of the first radius of gyration Lx and the second radius of gyration Ly calculated in step S5 into "Ly" of Equation (D) (step S7).

In a case where it is determined that the difference is equal to or greater than the threshold value TH (step S6: NO), the corrector 12 determines whether or not the first distance px is greater than the second distance py (step S8).

In a case where the first distance px is greater than the second distance py (step S8: YES), the corrector 12 calculates the shift blur amounts Sx and Sy by using only the first radius of gyration Lx calculated in step S5.

Specifically, the corrector 12 calculates the shift blur amount Sx by substituting the first radius of gyration Lx calculated in step S5 into "Lx" in Equation (B), and calculates the shift blur amount Sy by substituting the first radius of gyration Lx calculated in step S5 into "Ly" in Equation (D) (step S9).

In a case where the first distance px is less than the second distance py (step S8: NO), the corrector 12 calculates the shift blur amounts Sx and Sy by using only the second radius of gyration Ly calculated in step S5.

Specifically, the corrector 12 calculates the shift blur amount Sx by substituting the second radius of gyration Ly calculated in step S5 into "Lx" in Equation (B), and calculates the shift blur amount Sy by substituting the second radius of gyration Ly calculated in step S5 into "Ly" in Equation (D) (step S10).

The corrector 12 calculates the shift blur amounts Sx and Sy in step S7, step S9, or step S10, and corrects the shift blur of the captured image signal output from the image sensor 20 by controlling the image blur correction mechanism 3 so as to cancel the shift blur amounts Sx and Sy (step S11).

As described above, the digital camera 100 selects the rotation axis assumed to be the rotation center in a case where the digital camera 100 roll-rotates, and determines whether the shift blur amounts Sx and Sy are calculated by using only the first radius of gyration Lx, the shift blur amounts Sx and Sy are calculated by using only the second radius of gyration Ly, or the shift blur amounts Sx and Sy are calculated by using both the first radius of gyration Lx and the second radius of gyration Ly based on the distance between this rotation axis and the acceleration sensor 107.

In a case where the difference between the first distance px and the second distance py between the selected rotation axis and the acceleration sensor 107 is less than the threshold value TH, it is possible to determine that there is no difference in accuracy between the first radius of gyration Lx and the second radius of gyration Ly. Thus, in this case, it is assumed that the calculation accuracy of the shift blur amounts Sx and Sy can be improved by calculating the shift blur amounts Sx and Sy by using both the first radius of gyration Lx and the second radius of gyration Ly even though the digital camera roll-rotates during the pitch rotation or the yaw rotation.

In a case where the difference between the first distance px and the second distance py between the selected rotation axis and the acceleration sensor 107 is equal to or greater than the threshold value TH and the first distance px is greater than the second distance py (for example, in a case where the rotation axis R1 is selected), it is possible to determine that the first radius of gyration Lx is closer to the accurate value than the second radius of gyration Ly as described above. Thus, in this case, the calculation accuracy of the shift blur amounts Sx and Sy can be calculated by calculating the shift blur amounts Sx and Sy by using only the first radius of gyration Lx even though the digital camera roll-rotates during the pitch rotation or the yaw rotation.

In a case where the difference between the first distance px and the second distance py between the selected rotation axis and the acceleration sensor 107 is equal to or greater than the threshold value TH and the first distance px is less than the second distance py (for example, in a case where the rotation axis R2 is selected), it is possible to determine that the second radius of gyration Ly is closer to the accurate value than the first radius of gyration Lx as described above. Thus, in this case, the calculation accuracy of the shift blur amounts Sx and Sy can be improved by calculating the shift blur amounts Sx and Sy using only the second radius of gyration Ly even though the digital camera roll-rotates during the pitch rotation or the yaw rotation.

In step S7, the corrector 12 may calculate the shift blur amount Sx by substituting the second radius of gyration Ly calculated in step S5 into "Lx" in Equation (B), and may calculate the shift blur amount Sy by substituting the first radius of gyration Lx calculated in step S5 into "Ly" in Equation (D). By doing so, it is possible to improve the calculation accuracy of the shift blur amounts Sx and Sy by absorbing the difference between the radius of gyration caused by a slight difference between the first distance px and the second distance py.

Figure 9:
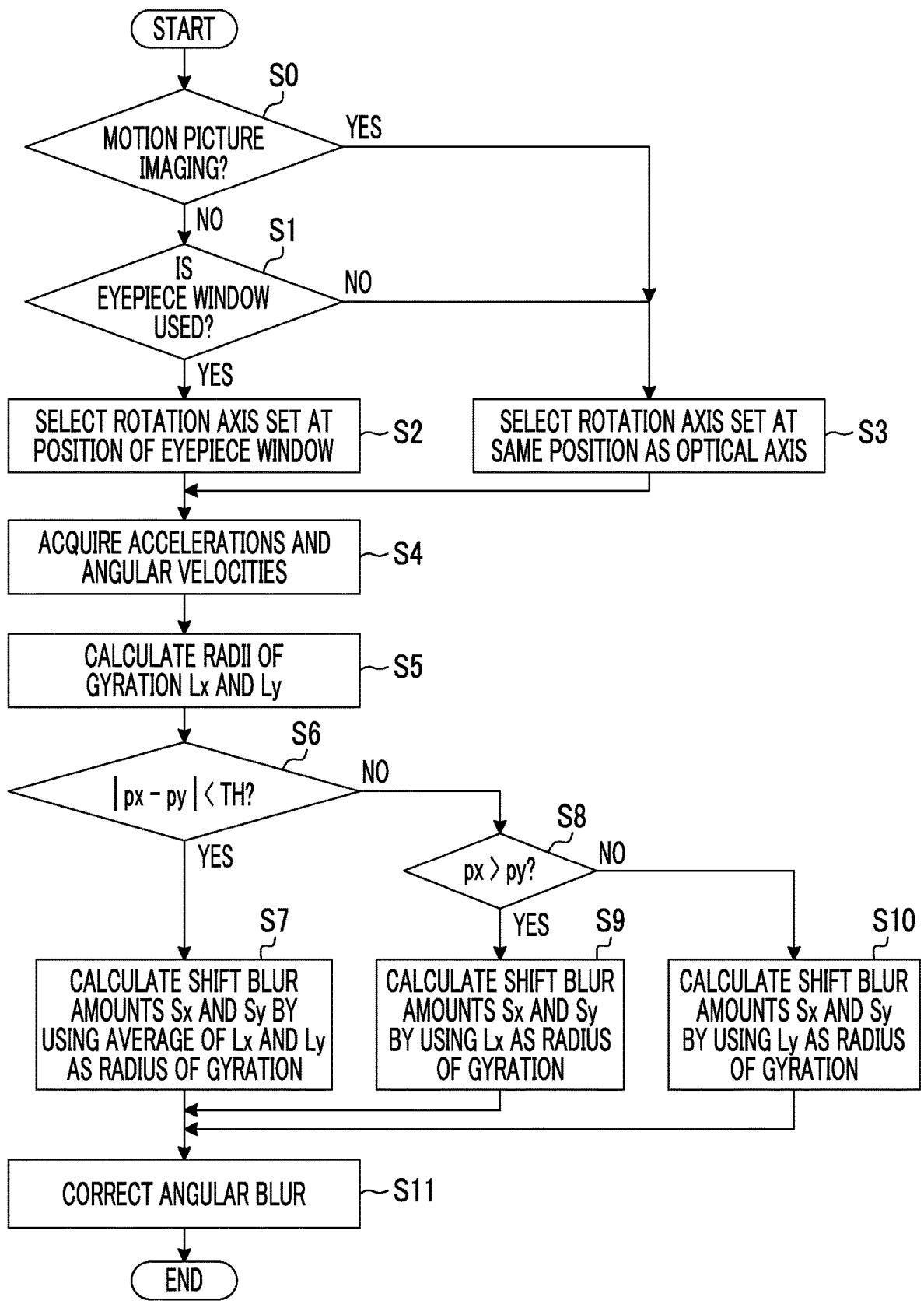
FIG. 9 is a flowchart for describing a modification example of the operation of the digital camera 100 shown in FIG. 1.

FIG. 9 is a flowchart for describing a modification example of the operation of the digital camera 100 shown in FIG. 1. The flowchart shown in FIG. 9 shows an operation after the shutter button 102a is pressed in a state in which the still image imaging mode or the motion picture imaging mode is set.

The flowchart shown in FIG. 9 is the same as FIG. 8 except that step S0 is added. The same processing in FIG. 9 as that in FIG. 8 is denoted by the same reference, and the description is omitted.

After the shutter button 102a is pressed, in step S0, the corrector 12 of the system control unit 1 determines whether or not the imaging mode is the motion picture imaging mode. The corrector 12 moves the processing to step S3 in a case where the imaging mode is the motion picture imaging mode (step S0: YES), and proceeds to step S1 in a case where the imaging mode is the still image imaging mode (step S0: NO).

According to the operation of the modification example described above, in the motion picture imaging mode, the rotation axis R1 is selected regardless of the usage state of the digital camera 100. The influence on the accelerations in the directions X and Y due to the roll rotation that can occur by pressing the shutter button 102a of the digital camera 100 is large in the still image imaging mode in which exposure is performed only once immediately after the shutter button 102a is pressed.

In the motion picture imaging mode, since the imaging is continuously performed after the shutter button 102a is pressed, the roll rotation occurs by pressing the shutter button 102a, and the influence on the captured image is slight even though there is the error in acceleration due to the roll rotation.

Since the imaging is performed while the digital camera 100 is held by both hands during the imaging of the motion picture in many cases, it is considered that the digital camera 100 easily roll-rotates around the rotation axis R1. Thus, the shift blur can be corrected with high accuracy by selecting the rotation axis R1 during the motion picture imaging.

Figure 10:
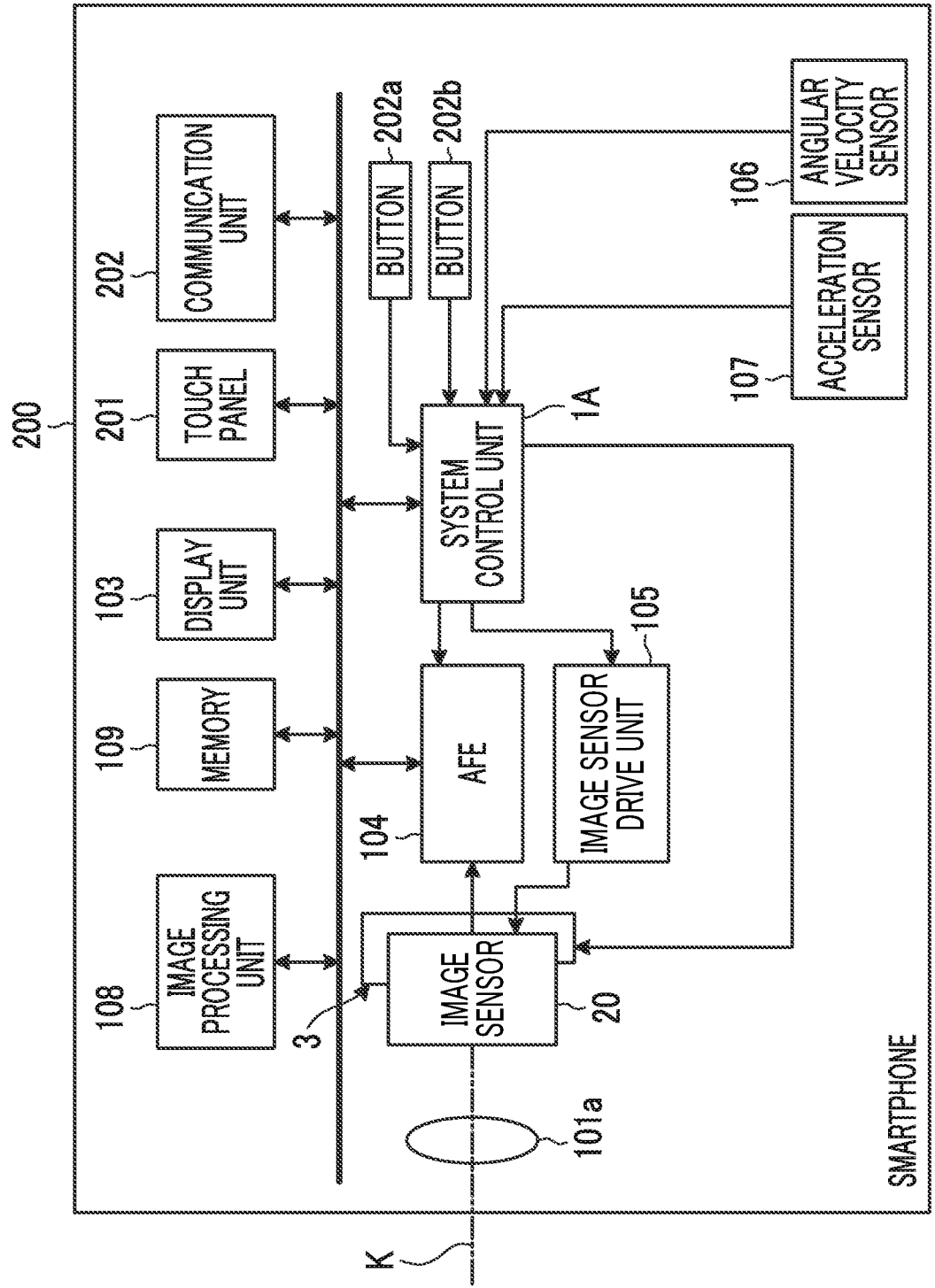
FIG. 10 is a block diagram showing a hardware configuration of a smartphone 200 which is an embodiment of the imaging apparatus of the present invention.
Figure 11:
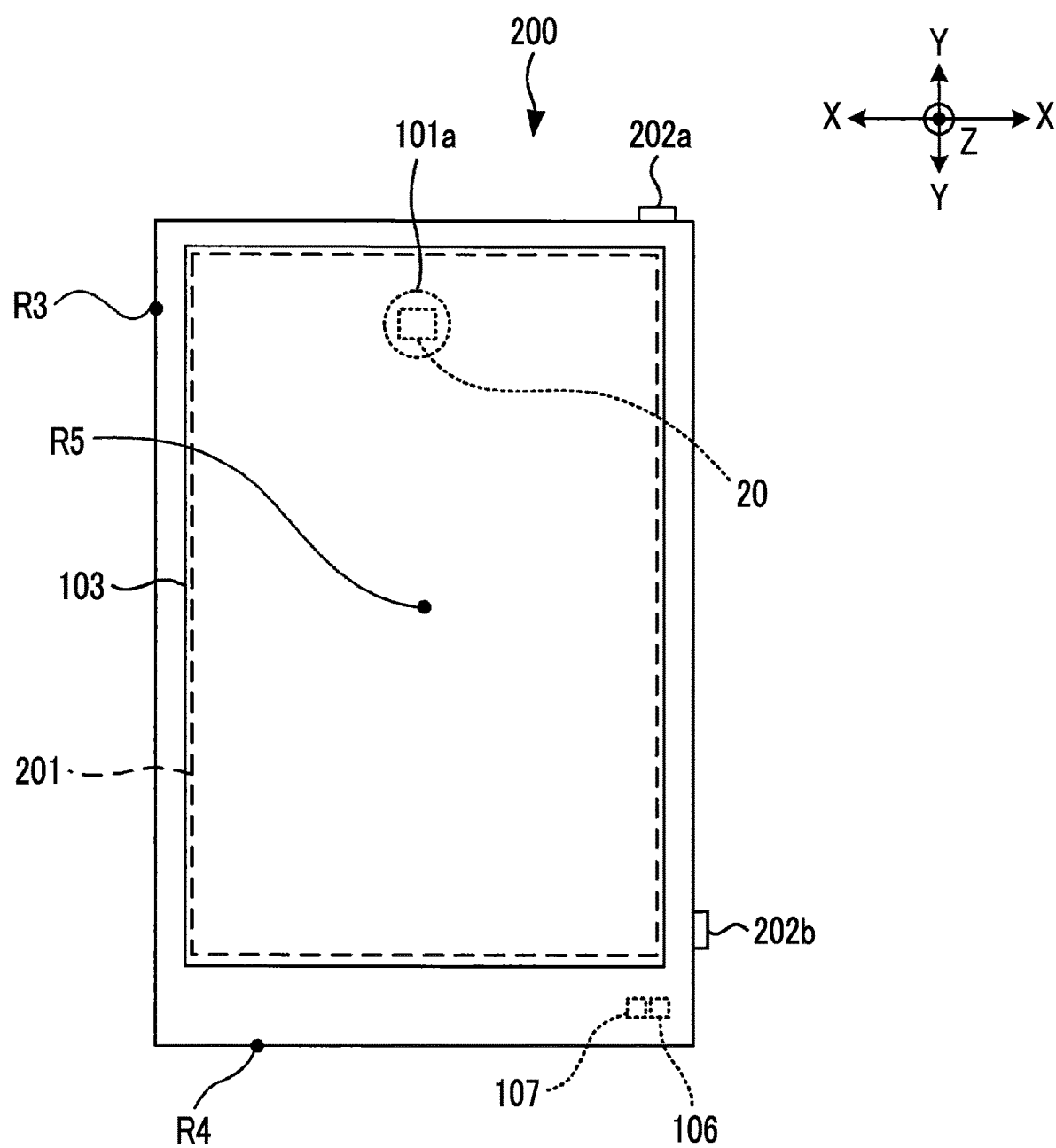
FIG. 11 is a front view showing a schematic configuration of the smartphone 200 shown in FIG. 10.

FIG. 10 is a block diagram showing a hardware configuration of a smartphone 200 which is an embodiment of the imaging apparatus of the present invention. FIG. 11 is a front view showing a schematic configuration of the smartphone 200 shown in FIG. 10. The same components in FIG. 10 as those in FIG. 3 are denoted by the same references.

The smartphone 200 shown in FIG. 10 is the same as the digital camera 100 of FIG. 3 except that the system control unit 1 is changed to a system control unit 1A by adding a touch panel 201, a communication unit 202, a button 202a, and a button 202b and deleting the shutter button 102a and the operation unit 102b. The communication unit 202 is a functional unit for performing near field communication or data communication via a mobile phone network.

As shown in FIG. 11, the display unit 103 is formed on a front surface of a housing of the smartphone 200, and the touch panel 201 is integrally formed on the display unit 103. The imaging optical system 101a is formed on a back surface of the housing of the smartphone 200 (a surface opposite to the front surface on which the display unit 103 is formed).

In the smartphone 200, a state in which the light receiving surface of the image sensor 20 is perpendicular to the vertical direction (a state in which the optical axis K is parallel to the vertical direction) and a state in which the center of the light receiving surface is located on the optical axis K is referred to as a reference state. In this reference state, a longitudinal direction of the light receiving surface of the image sensor 20 is defined as a direction X, a lateral direction of the light receiving surface of the image sensor 20 is defined as a direction Y, and a direction orthogonal to the direction X and the direction Y (a direction in which an optical axis of the imaging optical system 101a extends) is defined as a direction Z.

A planar shape of the display unit 103 viewed from the direction Z is rectangular. The longitudinal direction of the display unit 103 is the direction Y, and the lateral direction of the display unit 103 is the direction X.

As shown in FIG. 11, the button 202a is formed on an upper end of the housing of the smartphone 200 in the direction Y. The button 202b is formed on a right end of the housing of the smartphone 200 in the direction X.

The button 202a and the button 202b each function as a shutter button for instructing that the imaging of the subject is started in a state in which a camera application of the smartphone 200 is activated and the smartphone 200 shifts to the imaging mode. The button 202a and the button 202b each constitute an operation member provided at a position different from the display unit 103.

In the smartphone 200, a rotation axis R3, a rotation axis R4, and a rotation axis R5 are set as rotation axes in a case where the smartphone 200 rotates (roll-rotates) around the rotation axis parallel to the optical axis K in advance as shown in FIG. 11.

The rotation axis R5 is an axis extending in the direction Z and set at the center of the display unit 103. The rotation axis R3 is an axis extending in the direction Z and set near the upper end in the direction Y at the left end of the housing of the smartphone 200 in the direction X. The rotation axis R4 is an axis extending in the direction Z and set near the left end in the direction X at a lower end of the housing of the smartphone 200 in the direction Y.

The rotation axis R3 and the rotation axis R4 form two rotation axes present at positions different from the optical axis K. The rotation axis R3 is one rotation axis of the two rotation axes, and the rotation axis R4 is the other rotation axis of the two rotation axes.

Unlike the digital camera 100 of FIG. 1, the smartphone 200 does not have the eyepiece window. Thus, in a case where the smartphone 200 shifts to the imaging mode, the live view image captured by the image sensor 20 is displayed on the display unit 103.

In a case where so-called portrait shooting is performed by the smartphone 200, a posture of the smartphone 200 is determined such that the longitudinal direction of the display unit 103 (that is, the direction Y) and the vertical direction are substantially parallel. In a case where so-called landscape shooting is performed by the smartphone 200, the posture of the smartphone 200 is determined such that the lateral direction of the display unit 103 (that is, the direction X) and the vertical direction are substantially parallel.

In the state in which the posture of the smartphone 200 is determined such that the longitudinal direction (direction Y) of the display unit 103 and the vertical direction are substantially parallel to each other, the user determines a composition while holding the vicinity of the button 202a with a right finger and supporting the vicinity of the rotation axis R4 with a left finger. The user images the subject by pressing the button 202a in the direction Y. As described above, in a case where it is assumed that the portrait shooting is performed by using the button 202a, there is a high possibility that the smartphone 200 roll-rotates around the vicinity of the left finger supporting the smartphone 200. The rotation axis R4 is set at a position substantially on a diagonal line of the button 202a on the assumption of such a case.

In the state in which the posture of the smartphone 200 is determined such that the lateral direction (direction X) of the display unit 103 and the vertical direction are substantially parallel to each other, the user determines a composition while holding the vicinity of the button 202b with the right finger and supporting the vicinity of the rotation axis R3 with the left finger. The user images the subject by pressing the button 202b in the direction X. As described above, in a case where it is assumed that the landscape shooting is performed by using the button 202b, there is a high possibility that the smartphone 200 roll-rotates around the vicinity of the left finger supporting the smartphone 200. The rotation axis R3 is set at a position substantially on a diagonal line of the button 202b on the assumption of such a case.

The imaging instruction can be issued to the system control unit 1A by operating the touch panel 201 without using the buttons 202a and 202b in a state in which the smartphone 200 shifts to the imaging mode. As described above, in a case where the imaging is performed by operating the touch panel 201, the housing of the smartphone 200 is firmly gripped by both hands in many cases. Thus, in this case, there is a high possibility that the smartphone 200 roll-rotates around the center of the display unit 103. The rotation axis R5 is set at the center of the display unit 103 on the assumption of such a case.

Figure 12:
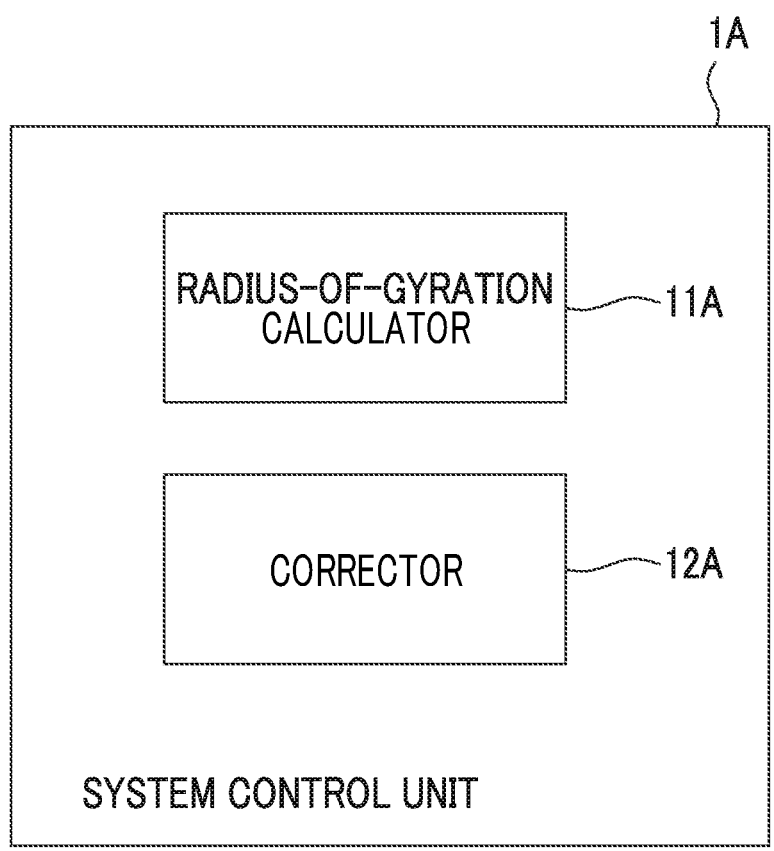
FIG. 12 is a functional block diagram of a system control unit 1A shown in FIG. 10.

FIG. 12 is a functional block diagram of the system control unit 1A shown in FIG. 10. The system control unit 1A functions as a radius-of-gyration calculator 11A and a corrector 12A by executing a program including the image blur correction program stored in the ROM of the memory 109. In the smartphone 200, the system control unit 1A, the acceleration sensor 107, and the angular velocity sensor 106 constitute the image blur correction device.

A function of the radius-of-gyration calculator 11A is the same as that of the radius-of-gyration calculator 11 of FIG. 4.

A function of the corrector 12A is almost the same as that of the corrector 12 of FIG. 4, but is different from the corrector 12 in that the rotation axis to be selected is any of the rotation axes R3, R4, and R5 shown in FIG. 11.

Specifically, the corrector 12A selects the rotation axis R5 in the usage state in which the imaging is performed by operating the touch panel 201 (so-called touch imaging), selects the rotation axis R4 in the usage state in which the imaging is performed by operating the button 202a and the direction Y is the vertical direction (state of so-called portrait shooting), and selects the rotation axis R3 in the usage state in which the imaging is performed by operating the button 202b and the direction X is the vertical direction (state of so-called landscape shooting).

The usage state of the smartphone 200 indicates a state in which the smartphone 200 is used in a case where the imaging mode is set. In the smartphone 200, the usage state includes a state in which the touch imaging is performed, a state in which the button is operated in the portrait shooting, and a state in which the button is operated in the landscape shooting.

Figure 13:
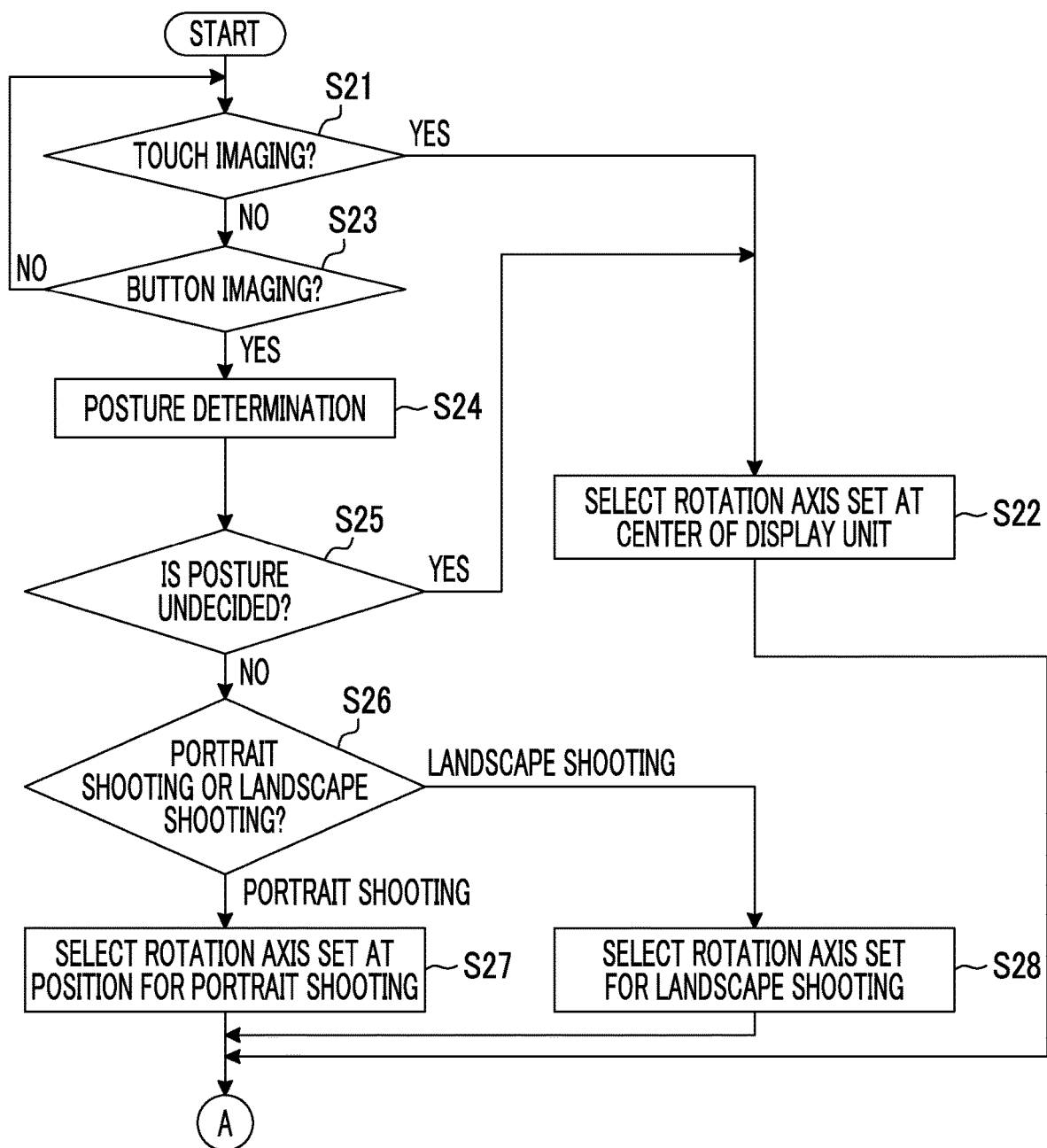
FIG. 13 is a flowchart for describing an operation of the smartphone 200 shown in FIG. 10 in a still image imaging mode.
Figure 14:
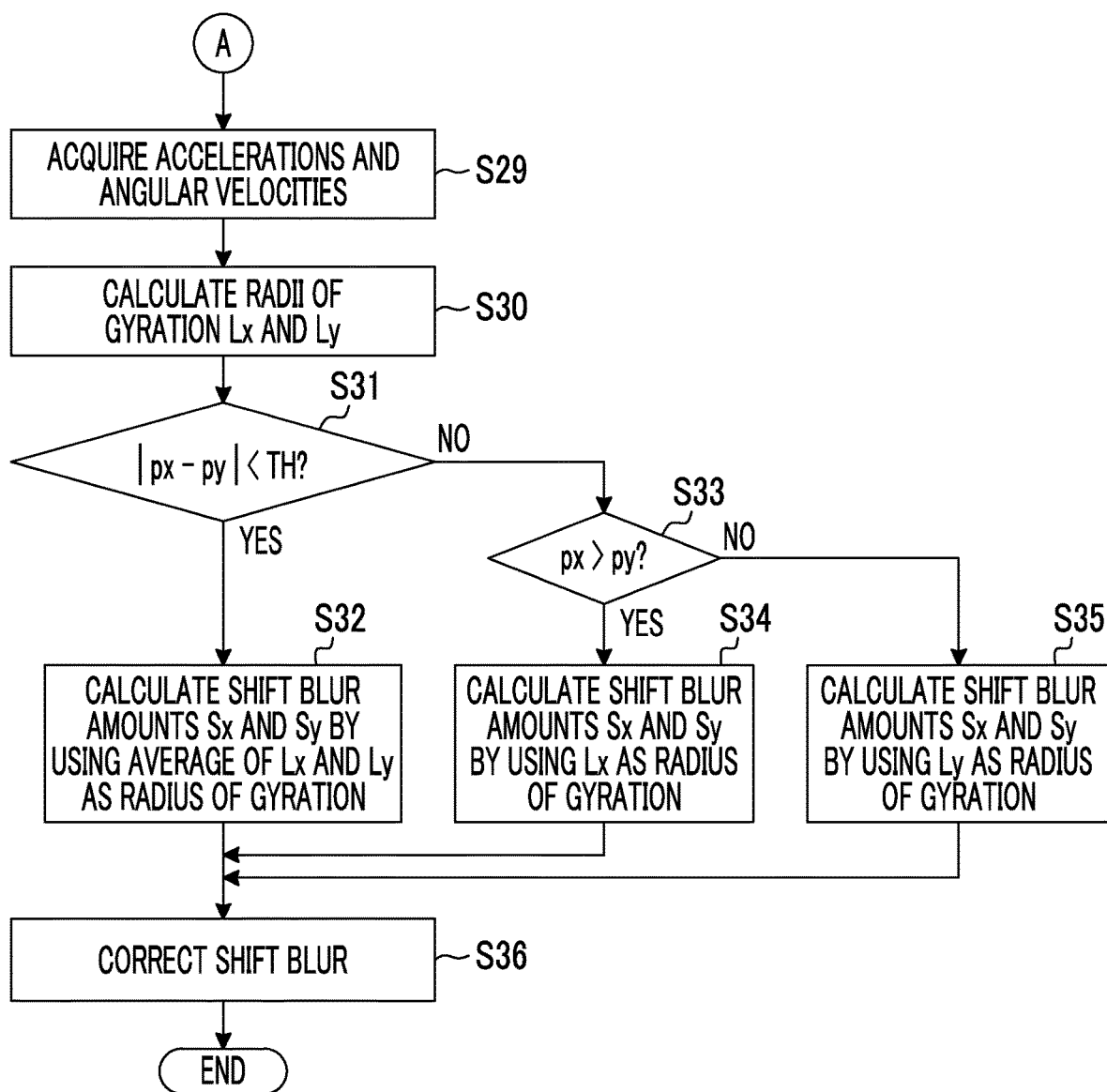
FIG. 14 is a flowchart for describing an operation of the smartphone 200 shown in FIG. 10 in the still image imaging mode.

FIGS. 13 and 14 are flowcharts for describing an operation of the smartphone 200 shown in FIG. 10 in the still image imaging mode.

In a case where the imaging instruction is given by the operation of the touch panel 201 (step S21: YES), the corrector 12A of the system control unit 1A selects the rotation axis R5 set at the center of the display unit 103 (step S22).

In a case where the imaging instruction is not given by the operation of the touch panel 201 (step S21: NO), the corrector 12A determines whether or not the imaging instruction is given by the operation of either the button 202a or the button 202b (step S23).

In a case where the imaging instruction is not given by the operation of either the button 202a or the button 202b, the corrector 12A returns the processing to step S21 (step S23: NO).

In a case where the imaging instruction is given by the operation of either the button 202a or the button 202b (step S23: YES), the corrector 12A determines whether or not the posture of the smartphone 200 is either of a landscape shooting posture in which the direction X is the vertical direction or a portrait shooting posture in which the direction Y is the vertical direction based on a detection signal of the acceleration sensor 107 (step S24).

As a result of the determination in step S24, in a case where it is not possible to discriminate between the portrait shooting posture and the landscape shooting posture (step S25: YES), the corrector 12A selects the rotation axis R5 in step S22.

As the result of the determination in step S24, in a case where it is determined that the posture is the portrait shooting posture (step S26: portrait shooting), the corrector 12A selects the rotation axis R4 set at the position on the assumption of the portrait shooting (step S27).

As the result of the determination in step S24, in a case where it is determined that the posture is the landscape shooting posture (step S26: landscape shooting), the corrector 12A selects the rotation axis R3 set at the position on the assumption of the landscape shooting (step S28).

After the rotation axis is selected in any of step S22, step S27, and step S28, the system control unit 1A acquires the first acceleration Atx and the second acceleration Aty from the acceleration sensor 107, and acquires the first angular velocity ωx and the second angular velocity ωy from the angular velocity sensor 106 (step S29).

Subsequently, the radius-of-gyration calculator 11A calculates the first radius of gyration Lx by the calculation of Equation (A) based on the first acceleration Atx and the first angular velocity ωx acquired in step S29, and calculates the second radius of gyration Ly by the calculation of Equation (C) based on the second acceleration Aty and the second angular velocity ωy acquired in step S29 (step S30).

Subsequently, the corrector 12A calculates the difference between the first distance px in the direction X and the second distance py in the direction Y between the rotation axis selected in any of step S22, step S27, and step S28 and the acceleration sensor 107, and determines whether or not the difference is less than the threshold value TH (step S31). Information on the first distance px and the second distance py in the directions X and Y between the rotation axis R3, R4, or R5 and the acceleration sensor 107 is stored in advance in the ROM of the memory 109 of the smartphone 200.

In a case where it is determined that the difference is less than the threshold value TH (step S31: YES), the corrector 12A calculates the shift blur amounts Sx and Sy by using both the first radius of gyration Lx and the second radius of gyration Ly calculated in step S30 (step S32). The calculation method herein is the same as that of step S7 of FIG. 8.

In a case where it is determined that the difference is equal to or greater than the threshold value TH (step S31: NO), the corrector 12A determines whether or not the first distance px is greater than the second distance py (step S33).

In a case where the first distance px is greater than the second distance py (step S33: YES), the corrector 12A calculates the shift blur amounts Sx and Sy by using only the first radius of gyration Lx calculated in step S30 in the same method as step S9 of FIG. 8 (step S34).

In a case where the first distance px is less than the second distance py (step S33: NO), the corrector 12A calculates the shift blur amounts by using only the second radius of gyration Ly calculated in step S30 in the same method as step S10 of FIG. 8.

The corrector 12A calculates the shift blur amounts Sx and Sy in step S32, step S34, or step S35, and corrects the shift blur of the captured image signal output from the image sensor 20 by controlling the image blur correction mechanism 3 so as to cancel the shift blur amounts Sx and Sy (step S36).

According to the smartphone 200, in a case where the imaging is performed by operating the touch panel 201, it is determined that the smartphone can roll-rotate around the rotation axis R5, and the radius of gyration used in the calculation of the shift blur amounts Sx and Sy are selected. In a case where the portrait shooting is performed by operating the button 202a, it is determined that the smartphone can roll-rotate around the rotation axis R4, and the radius of gyration used in the calculation of the shift blur amounts Sx and Sy are selected. In a case where the landscape shooting is performed by operating the button 202b, it is determined that the smartphone can roll-rotate around the rotation axis R3, and the radius of gyration used in the calculation of the shift blur amounts Sx and Sy are selected. Thus, the shift blur amounts can be calculated by using the radius of gyration closer to a more accurate value according to the usage state of the smartphone 200, and the shift blur of the captured image signal can be corrected with high accuracy.

In the smartphone 200, in a case where it is not possible to discriminate whether the posture of the smartphone 200 is the portrait shooting posture or the landscape shooting posture in a case where the imaging is performed, the rotation axis R5 set at the center of the display unit 103 is selected.

For example, in a case where it is erroneously determined that the posture of the smartphone is the landscape shooting posture even though the posture is actually the portrait shooting posture, the rotation axis R3 is selected, and thus, the distances between the rotation axis R3 and the acceleration sensor 107 is greater than the correct distances (distances between the rotation axis R4 and the acceleration sensor 107). In such a case, in a case where the rotation axis R5 is selected, the distances between the rotation axis R5 and the acceleration sensor 107 approach the correct distances. Thus, even in a situation in which the posture cannot be discriminated, it is possible to prevent the calculation accuracy of the shift blur amounts Sx and Sy from being lowered, and it is possible to correct the shift blur of the captured image signal with high accuracy.

In the operation of FIGS. 13 and 14, step S21 is not essential, and may be a deleted operation. The rotation axes set in the smartphone 200 may be only the rotation axes R3 and R4. In the operation of the smartphone 200 in the still image imaging mode operation in this case, in a case where step S21 and step S22 are deleted in FIGS. 13 and 14 and the determination in step S25 is YES, for example, only the correction of the translation blur may be performed without calculating the shift blur amounts Sx and Sy.

In the digital camera 100 shown in FIG. 2, for example, it is considered that a button for exclusive use of the portrait shooting different from the shutter button 102a is provided on a left side surface of the housing. In the case of such a configuration, the rotation axis on the assumption of the portrait shooting and the rotation axis on the assumption of the landscape shooting may be set at positions different from the rotation axes R1 and R2 of FIG. 7. In the operation of the digital camera 100 having this configuration, step S21 is deleted in FIGS. 13 and 14, and the processing of step S22 is changed to the processing of selecting the rotation axis R1.

Figure 15:
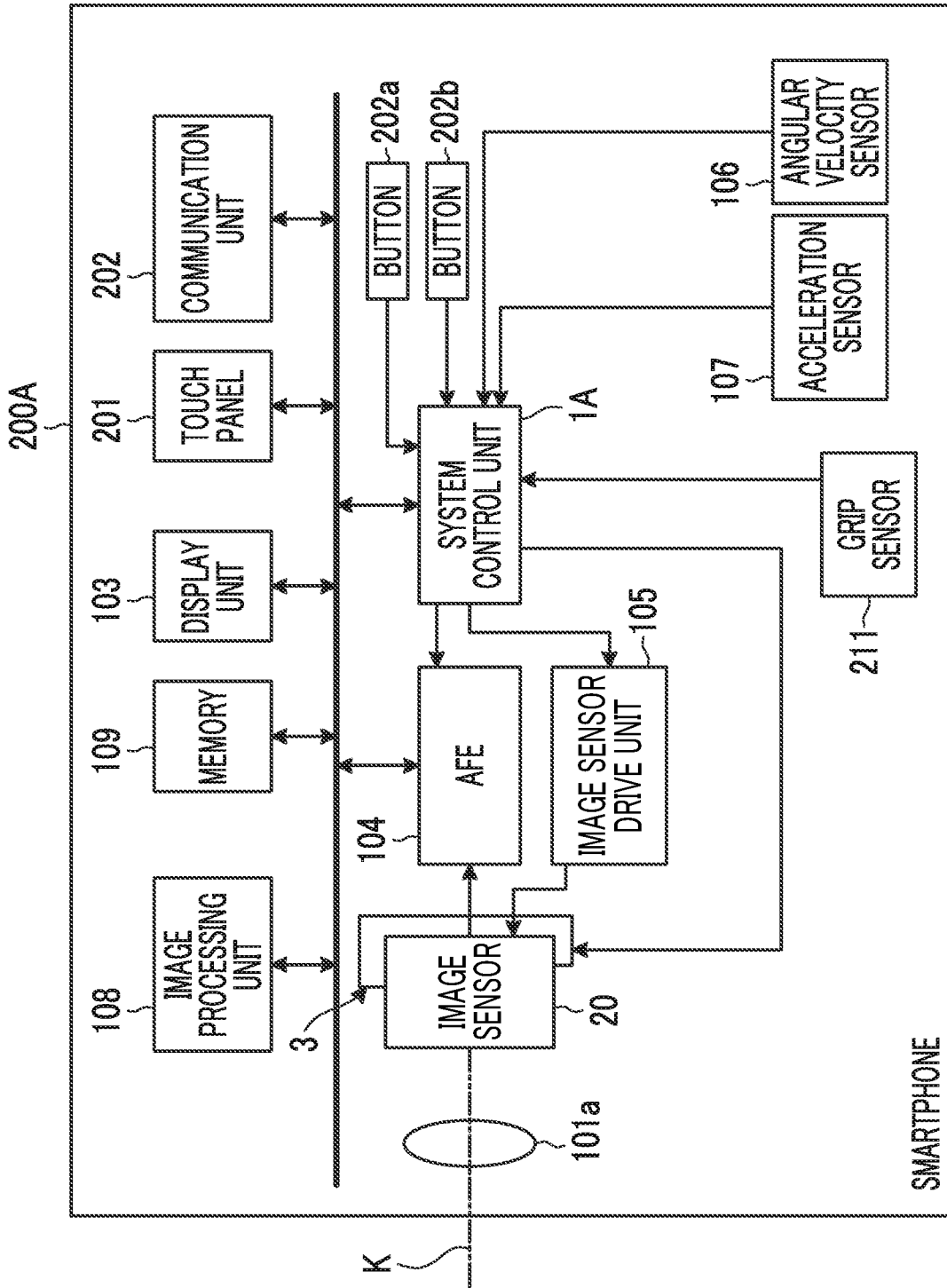
FIG. 15 is a diagram showing a hardware configuration of a smartphone 200A which is a modification example of the smartphone 200 shown in FIG. 10.

FIG. 15 is a diagram showing a hardware configuration of a smartphone 200A which is a modification example of the smartphone 200 shown in FIG. 10. The smartphone 200A shown in FIG. 15 is the same as the smartphone 200 except that a grip sensor 211 is added.

The grip sensor 211 is a sensor for detecting that the housing of the smartphone 200A is gripped by the hand, and is, for example, a piezoelectric sensor or the like. The appearance of the smartphone 200A is the same as that of the smartphone 200.

Figure 16:
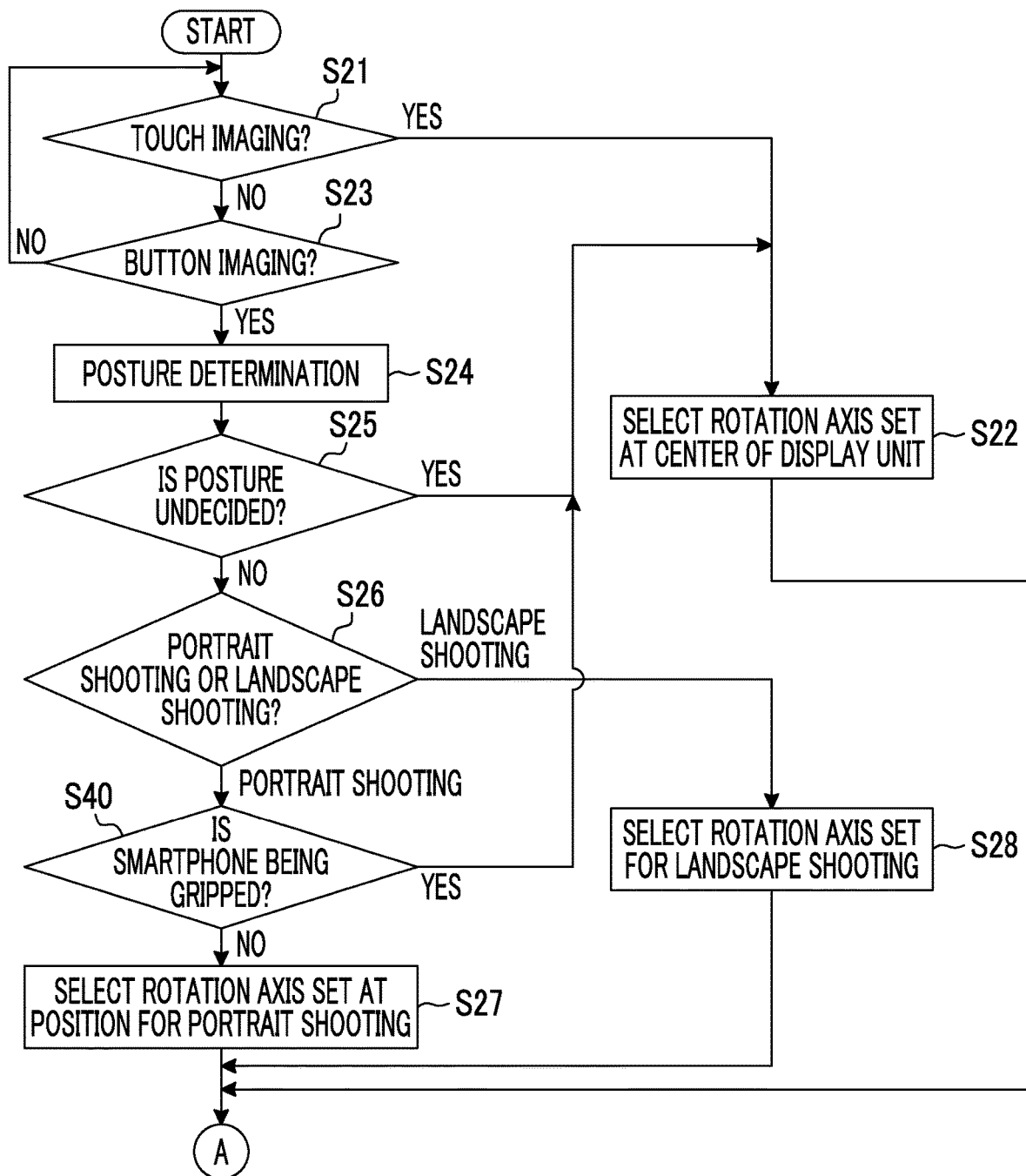
FIG. 16 is a flowchart for describing an operation of the smartphone 200A shown in FIG. 15 in a still image imaging mode.

FIG. 16 is a flowchart for describing an operation of the smartphone 200A shown in FIG. 15 in the still image imaging mode. The flowchart shown in FIG. 16 is the same as the flowchart shown in FIG. 13 except that step S40 is added between steps S26 and S27. The processing after step S27 shown in FIG. 16 is the same as that in FIG. 14.

As a result of the posture determination in step S24, in a case where it is determined that the posture is the portrait shooting (step S26: portrait shooting), the corrector 12A of the system control unit 1A of the smartphone 200A determines whether or not the smartphone 200A is gripped based on an output signal of the grip sensor 211 (step S40).

In a case where it is determined that the smartphone 200A is gripped (step S40: YES), the corrector 12A selects the rotation axis R5 set at the center of the display unit 103 in step S22.

In a case where it is determined that the smartphone 200A is not gripped (step S40: NO), the corrector 12A selects the rotation axis R4 in step S27.

Figure 17:
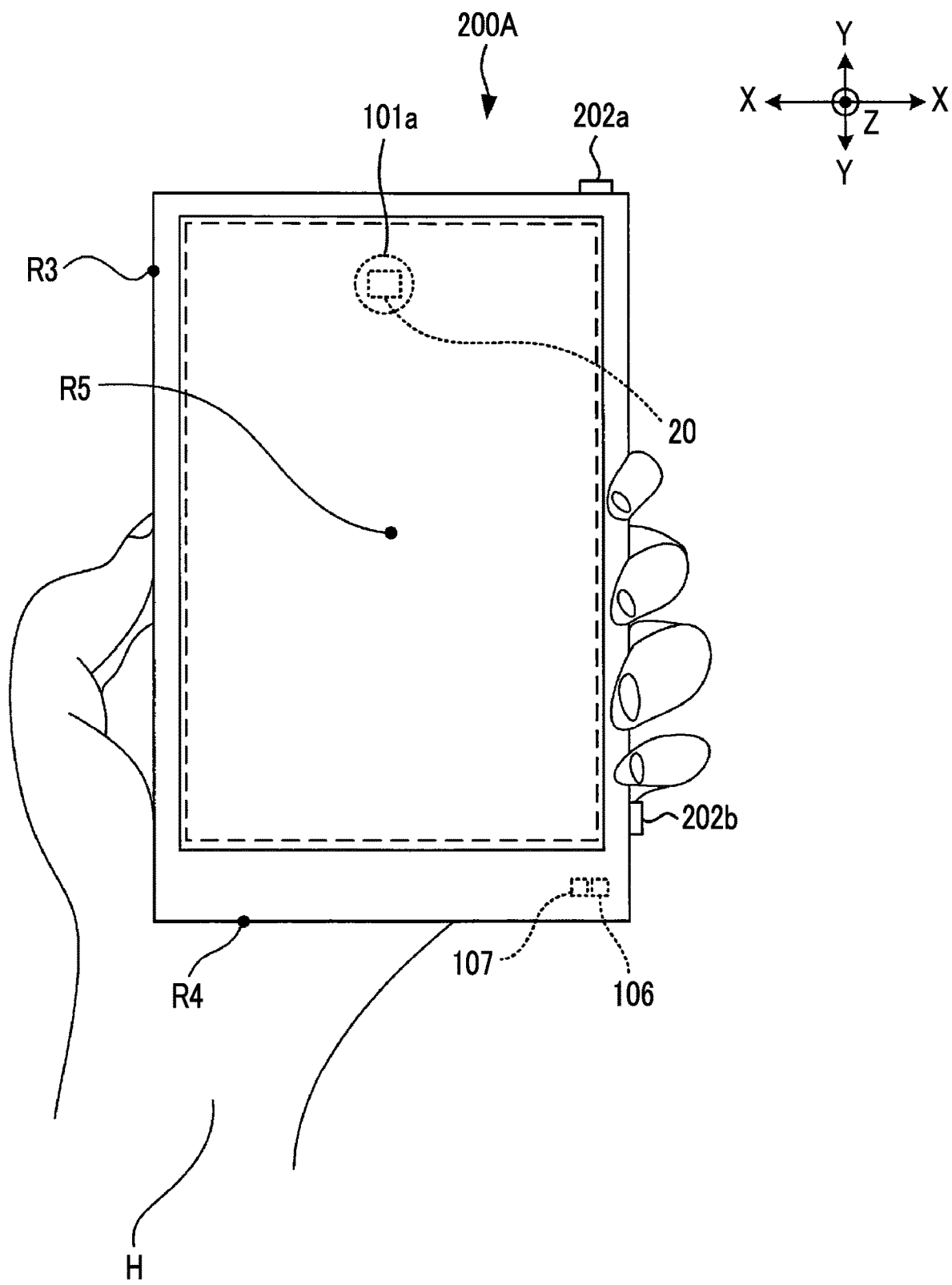
FIG. 17 is a diagram showing a state in which the smartphone 200A shown in FIG. 15 is gripped in portrait shooting.

Even though the posture of the smartphone 200A is the portrait shooting posture in which the direction Y is the vertical direction, the user performs the imaging while fixing the smartphone 200A by gripping the smartphone with a left hand H as shown in FIG. 17 and pressing the button 202a with the right finger in this state in some cases. In such a case (that is, in a case where the determination in step S40 is YES), since there is a possibility that the smartphone 200A roll-rotates around the rotation axis R4 is lowered, it is possible to further improve the accuracy of the shift blur correction by selecting the rotation axis R5.

In the motion picture imaging mode of the smartphone 200 or the smartphone 200A, in a case where the imaging instruction is performed regardless of whether the imaging is the touch imaging, button imaging, or any imaging of the portrait shooting and the landscape shooting, it is preferable that the corrector 12A selects the rotation axis R5 and calculates the shift blur amounts Sx and Sy. Since the smartphone 200 or 200A performs the imaging while being gripped by both hands during the motion picture imaging, it is considered that the smartphone 200 or 200A is likely to roll-rotate around the rotation axis R5. Thus, the shift blur correction can be performed with high accuracy by selecting the rotation axis R5 during the motion picture imaging.

Although it has been described in the digital camera 100, the smartphone 200, and the smartphone 200A that the shift blur correction is performed by moving the image sensor 20 by the image blur correction mechanism 3, the present invention is not limited thereto. The image blur correction mechanism 3 may correct the shift blur by moving a correction lens included in the imaging optical system 101a, or may correct the shift blur by moving both the image sensor 20 and the correction lens included in the imaging optical system 101a. The blur correction may be electronically performed without optically performing the blur correction as in the image blur correction mechanism 3.

As described above, the following matters are disclosed in this specification.

(1) There is provided an image blur correction device that corrects a blur of a captured image signal output from an image sensor which images a subject through an imaging optical system. The device comprises an acceleration sensor that detects a first acceleration in one direction of two directions which are orthogonal to an optical axis of the imaging optical system of an imaging apparatus including the image sensor and are orthogonal to each other and a second acceleration in the other direction of the two directions, an angular velocity sensor that detects a first angular velocity of the imaging apparatus around a first axis parallel to the other direction and a second angular velocity of the imaging apparatus around a second axis parallel to the one direction, a radius-of-gyration calculator that calculates a first radius of gyration of the imaging apparatus around the first axis based on the first acceleration and the first angular velocity and a second radius of gyration of the imaging apparatus around the second axis based on the second acceleration and the second angular velocity, and a corrector that calculates a first blur amount of the captured image signal in the one direction generated by rotation of the imaging apparatus around the first axis based on the first angular velocity and at least one of the first radius of gyration or the second radius of gyration, calculates a second blur amount of the captured image signal in the other direction generated by rotation of the imaging apparatus around the second axis based on the second angular velocity and at least one of the first radius of gyration or the second radius of gyration, and corrects the calculated blur amounts. The corrector selects one rotation axis from among a plurality of rotation axes determined in advance parallel to the optical axis based on a usage state of the imaging apparatus, and determines the radius of gyration used in the calculation of the first blur amount and the second blur amount based on distances in the two directions from the selected rotation axis to the acceleration sensor.

(2) In the image blur correction device according to (1), in a case where a difference between a first distance in the one direction from the selected rotation axis to the acceleration sensor and a second distance in the other direction from the selected rotation axis to the acceleration sensor is equal to or greater than a predetermined value and the first distance is greater than the second distance, the corrector calculates the first blur amount based on the first angular velocity and the first radius of gyration, and calculates the second blur amount based on the second angular velocity and the first radius of gyration.

(3) In the image blur correction device according to (2), in a case where the difference is equal to or greater than the value and the first distance is less than the second distance, the corrector calculates the first blur amount based on the first angular velocity and the second radius of gyration, and calculates the second blur amount based on the second angular velocity and the second radius of gyration.

(4) In the image blur correction device according to (2) or (3), in a case where the difference is less than the value, the corrector calculates the first blur amount based on the first angular velocity and the second radius of gyration, and calculates the second blur amount based on the second angular velocity and the first radius of gyration.

(5) In the image blur correction device according to (2) or (3), in a case where the difference is less than the value, the corrector calculates the first blur amount based on the first angular velocity and an average value of the first radius of gyration and the second radius of gyration, and calculates the second blur amount based on the second angular velocity and the average value.

(6) In the image blur correction device according to any one of (1) to (5), the imaging apparatus comprises an eyepiece window for observing the subject, the plurality of rotation axes includes a rotation axis set at a position of the eyepiece window and a rotation axis set at the same position as the optical axis, and the corrector selects the rotation axis set at the position of the eyepiece window in the usage state in which the subject is observed by using the eyepiece window, and selects the rotation axis set at the same position as the optical axis in the usage state in which the subject is observed without using the eyepiece window.

(7) In the image blur correction device according to any one of (1) to (5), the plurality of rotation axes includes two rotation axes present at positions different from the optical axis, and the corrector selects one of the two rotation axes in the usage state in which the one direction is a vertical direction, and selects the other rotation axis of the two rotation axes in the usage state in which the other direction is the vertical direction.

(8) In the image blur correction device according to (7), the plurality of rotation axes includes a rotation axis present at the same position as the optical axis, and the corrector selects the rotation axis present at the same position as the optical axis in the usage state in which the state in which the one direction is the vertical direction and the state in which the other direction is the vertical direction are not able to be discriminated from each other.

(9) In the image blur correction device according to any one of (1) to (8), the plurality of rotation axes includes a rotation axis present at the same position as the optical axis, and the corrector selects the rotation axis present at the same position as the optical axis in a case where the imaging apparatus is set in a motion picture imaging mode, and selects the rotation axis based on the usage state in a case where the imaging apparatus is set in a still image imaging mode.

(10) In the image blur correction device according to (7), the imaging apparatus comprises a display unit provided on surface opposite to the imaging optical system, a touch panel formed on the display unit, and an operation member provided at a position different from the display unit to give an imaging instruction, the plurality of rotation axes further includes a rotation axis which is different from the two rotation axes and is set at a center position of the display unit, and the corrector selects the rotation axis set at the center position in the usage state in which imaging is performed by operating the touch panel, selects one rotation axis of the two rotation axes in the usage state in which imaging is performed by operating the operation member and the one direction is the vertical direction, and selects the other rotation axis of the two rotation axes in the usage state in which imaging is performed by operating the operation member and the other direction is the vertical direction.

(11) In the image blur correction device according to (10), in the usage state in which the state in which the one direction is the vertical direction and the state in which the other direction is the vertical direction are not able to be discriminated from each other, the corrector selects the rotation axis set at the center position.

(12) In the image blur correction device according to (10) or (11), the imaging apparatus comprises a grip sensor detecting that the imaging apparatus is gripped, a longitudinal direction of the display unit is coincident with the other direction, and a lateral direction of the display unit is coincident with the one direction, and in the usage state in which the other direction is the vertical direction, imaging is performed by operating the operation member, and the grip sensor detects that the imaging apparatus is gripped, the corrector selects the rotation axis set at the center position.

(13) In the image blur correction device according to any one of (10) to (12), the corrector selects the rotation axis set at the center position in a case where the imaging apparatus is set in a motion picture imaging mode, and selects the rotation axis based on the usage state in a case where the imaging apparatus is set in a still image imaging mode.

(14) There is provided an imaging apparatus comprising the image blur correction device according to any one of (1) to (13), and the image sensor.

(15) There is provided an image blur correction method of correcting a blur of a captured image signal output from an image sensor which images a subject through an imaging optical system. The method comprises a radius-of-gyration calculation step of calculating a first radius of gyration of an imaging apparatus around a first axis based on a first acceleration and a first angular velocity detected by an acceleration sensor that detects the first acceleration in one direction of two directions which are orthogonal to an optical axis of the imaging optical system of the imaging apparatus including the image sensor and are orthogonal to each other and a second acceleration in the other direction of the two directions and an angular velocity sensor that detects the first angular velocity of the imaging apparatus around the first axis parallel to the other direction and a second angular velocity of the imaging apparatus around a second axis parallel to the one direction, and calculating a second radius of gyration of the imaging apparatus around the second axis based on the second acceleration and the second angular velocity, and a correction step of calculating a first blur amount of the captured image signal in the one direction generated by rotation of the imaging apparatus around the first axis based on the first angular velocity and at least one of the first radius of gyration or the second radius of gyration, calculating a second blur amount of the captured image signal in the other direction generated by rotation of the imaging apparatus around the second axis based on the second angular velocity and at least one of the first radius of gyration or the second radius of gyration, and correcting the calculated blur amounts. In the correction step, one rotation axis is selected from among a plurality of rotation axes determined in advance parallel to the optical axis based on a usage state of the imaging apparatus, and the radius of gyration used in the calculation of the first blur amount and the second blur amount is determined based on distances in the two directions from the selected rotation axis to the acceleration sensor.

(16) In the image blur correction method according to (15), in the correction step, in a case where a difference between a first distance in the one direction from the selected rotation axis to the acceleration sensor and a second distance in the other direction from the selected rotation axis to the acceleration sensor is equal to or greater than a predetermined value and the first distance is greater than the second distance, the first blur amount is calculated based on the first angular velocity and the first radius of gyration, and the second blur amount is calculated based on the second angular velocity and the first radius of gyration.

(17) In the image blur correction method according to (16), in the correction step, in a case where the difference is equal to or greater than the value and the first distance is less than the second distance, the first blur amount is calculated based on the first angular velocity and the second radius of gyration, and the second blur amount is calculated based on the second angular velocity and the second radius of gyration.

(18) In the image blur correction method according to (16) or (17), in the correction step, in a case where the difference is less than the value, the first blur amount is calculated based on the first angular velocity and the second radius of gyration, and the second blur amount is calculated based on the second angular velocity and the first radius of gyration.

(19) In the image blur correction method according to (16) or (17), in the correction step, in a case where the difference is less than the value, the first blur amount is calculated based on the first angular velocity and an average value of the first radius of gyration and the second radius of gyration, and the second blur amount is calculated based on the second angular velocity and the average value.

(20) In the image blur correction method according to any one of (15) to (19), the imaging apparatus comprises an eyepiece window for observing the subject, the plurality of rotation axes includes a rotation axis set at a position of the eyepiece window and a rotation axis set at the same position as the optical axis, and in the correction step, the rotation axis set at the position of the eyepiece window is selected in the usage state in which the subject is observed by using the eyepiece window, and the rotation axis set at the same position as the optical axis is selected in the usage state in which the subject is observed without using the eyepiece window.

(21) In the image blur correction method according to any one of (15) to (19), the plurality of rotation axes includes two rotation axes present at positions different from the optical axis, and in the correction step, one of the two rotation axes is selected in the usage state in which the one direction is a vertical direction, and the other rotation axis of the two rotation axes is selected in the usage state in which the other direction is the vertical direction.

(22) In the image blur correction method according to (21), the plurality of rotation axes includes a rotation axis present at the same position as the optical axis, and in the correction step, the rotation axis present at the same position as the optical axis is selected in the usage state in which the state in which the one direction is the vertical direction and the state in which the other direction is the vertical direction are not able to be discriminated from each other.

(23) In the image blur correction method according to any one of (15) to (22), the plurality of rotation axes includes a rotation axis present at the same position as the optical axis, and in the correction step, the rotation axis present at the same position as the optical axis is selected in a case where the imaging apparatus is set in a motion picture imaging mode, and the rotation axis is selected based on the usage state in a case where the imaging apparatus is set in a still image imaging mode.

(24) In the image blur correction method according to (21), the imaging apparatus comprises a display unit provided on surface opposite to the imaging optical system, a touch panel formed on the display unit, and an operation member provided at a position different from the display unit to give an imaging instruction, the plurality of rotation axes includes a rotation axis which is different from the two rotation axes and is set at a center position of the display unit, and in the correction step, the rotation axis set at the center position is selected in the usage state in which imaging is performed by operating the touch panel, one rotation axis of the two rotation axes is selected in the usage state in which imaging is performed by operating the operation member and the one direction is the vertical direction, and the other rotation axis of the two rotation axes is selected in the usage state in which imaging is performed by operating the operation member and the other direction is the vertical direction.

(25) In the image blur correction method according to (24), in the correction step, in the usage state in which the state in which the one direction is the vertical direction and the state in which the other direction is the vertical direction are not able to be discriminated from each other, the rotation axis set at the center position is selected.

(26) In the image blur correction method according to (24) or (25), the imaging apparatus comprises a grip sensor detecting that the imaging apparatus is gripped, a longitudinal direction of the display unit is coincident with the other direction, and a lateral direction of the display unit is coincident with the one direction, and in the correction step, in the usage state in which the other direction is the vertical direction, imaging is performed by operating the operation member, and the grip sensor detects that the imaging apparatus is gripped, the rotation axis set at the center position is selected.

(27) In the image blur correction method according to any one of (24) to (26), in the correction step, the rotation axis set at the center position is selected in a case where the imaging apparatus is set in a motion picture imaging mode, and the rotation axis is selected based on the usage state in a case where the imaging apparatus is set in a still image imaging mode.

(28) There is provided an image blur correction program for correcting a blur of a captured image signal output from an image sensor which images a subject through an imaging optical system. The program causes a computer to execute a radius-of-gyration calculation step of calculating a first radius of gyration of an imaging apparatus around a first axis based on a first acceleration and a first angular velocity detected by an acceleration sensor that detects the first acceleration in one direction of two directions which are orthogonal to an optical axis of the imaging optical system of the imaging apparatus including the image sensor and are orthogonal to each other and a second acceleration in the other direction of the two directions and an angular velocity sensor that detects the first angular velocity of the imaging apparatus around the first axis parallel to the other direction and a second angular velocity of the imaging apparatus around a second axis parallel to the one direction, and calculating a second radius of gyration of the imaging apparatus around the second axis based on the second acceleration and the second angular velocity, and a correction step of calculating a first blur amount of the captured image signal in the one direction generated by rotation of the imaging apparatus around the first axis based on the first angular velocity and at least one of the first radius of gyration or the second radius of gyration, calculating a second blur amount of the captured image signal in the other direction generated by rotation of the imaging apparatus around the second axis based on the second angular velocity and at least one of the first radius of gyration or the second radius of gyration, and correcting the calculated blur amounts. In the correction step, one rotation axis is selected from among a plurality of rotation axes determined in advance parallel to the optical axis based on a usage state of the imaging apparatus, and the radius of gyration used in the calculation of the first blur amount and the second blur amount is determined based on distances in the two directions from the selected rotation axis to the acceleration sensor.

Although various embodiments have been described with reference to the drawings, the present invention is not limited to such examples. It is obvious to those skilled in the art that various changes or modifications can be conceived within the scope described in the claims, and naturally, these changes or modifications also belong to the technical scope of the present invention. The components in the above-described embodiment may be optionally combined without departing from the spirit of the invention.

The present application is based on the Japanese patent application filed on Jun. 27, 2018 (JP2018-122367), the contents of which are incorporated by reference into the present application.

The present invention is highly convenient and effective by being applied to a digital camera, a smartphone, or the like.

EXPLANATION OF REFERENCES

3: image blur correction mechanism
20: image sensor
100: digital camera
101: lens barrel
101a: imaging optical system
102a: shutter button
102b: operation unit
103: display unit
104: AFE
105: image sensor drive unit
106: angular velocity sensor
107: acceleration sensor
108: image processing unit
109: memory
108a: finder window
108b: eyepiece window
1, 1A: system control unit
11, 11A: radius-of-gyration calculator
12, 12A: corrector
K: optical axis
RS: rotation center
P: principal point position
YJ: first axis
XJ: second axis
ωx: first angular velocity
ωy: second angular velocity
Lx: first radius of gyration
Ly: second radius of gyration
Sx, Sy: shift blur amount
θx, θy: rotation angle
R1, R2, R3, R4, R5: rotation axis
200, 200A: smartphone
201: touch panel
202: communication unit
202a, 202b: button
211: grip sensor
H: left hand

What is claimed is:

1. An image blur correction device configured to correct a blur of an imaging apparatus that includes an image sensor which images a subject through an imaging optical system, the device comprising:
an acceleration sensor that detects a first acceleration in one direction of two directions which are orthogonal to an optical axis of the imaging optical system of the imaging apparatus and are orthogonal to each other and a second acceleration in the other direction of the two directions;
an angular velocity sensor that detects a first angular velocity of the imaging apparatus around a first axis parallel to the other direction and a second angular velocity of the imaging apparatus around a second axis parallel to the one direction; and
a processor configured to calculate a first radius of gyration of the imaging apparatus around the first axis based on the first acceleration and the first angular velocity and a second radius of gyration of the imaging apparatus around the second axis based on the second acceleration and the second angular velocity and
calculate a first blur amount of the captured image signal in the one direction generated by rotation of the imaging apparatus around the first axis based on the first angular velocity and at least one of the first radius of gyration or the second radius of gyration, calculates a second blur amount of the captured image signal in the other direction generated by rotation of the imaging apparatus around the second axis based on the second angular velocity and at least one of the first radius of gyration or the second radius of gyration, and corrects the calculated first blur amount and the calculated second blur amount,
wherein the processor corrects the blur of the imaging apparatus based on a member of the imaging apparatus that is used for an imaging of the imaging apparatus.

2. The image blur correction device according to claim 1, wherein, the processor determines a position of a rotation axis that is parallel to the optical axis based on the member of the imaging apparatus that is used for the imaging, and determines the first radius of gyration and the second radius of gyration used in calculating the first blur amount and the second blur amount based on distances in the two directions from the selected rotation axis to the acceleration sensor.

3. The image blur correction device according to claim 2, wherein, in a case where a difference between a first distance in the one direction from the rotation axis to the acceleration sensor and a second distance in the other direction from the rotation axis to the acceleration sensor is equal to or greater than a predetermined value and the first distance is greater than the second distance, the processor calculates the first blur amount based on the first angular velocity and the first radius of gyration, and calculates the second blur amount based on the second angular velocity and the first radius of gyration.

4. The image blur correction device according to claim 3, wherein, in a case where the difference is equal to or greater than the predetermined value and the first distance is less than the second distance, the processor calculates the first blur amount based on the first angular velocity and the second radius of gyration, and calculates the second blur amount based on the second angular velocity and the second radius of gyration.

5. The image blur correction device according to claim 3, wherein, in a case where the difference is less than the predetermined value, the processor calculates the first blur amount based on the first angular velocity and the second radius of gyration, and calculates the second blur amount based on the second angular velocity and the first radius of gyration.

6. The image blur correction device according to claim 2, wherein the imaging apparatus comprises an eyepiece window for observing the subject, and
the processor calculates the first blur amount and the second blur amount based on the rotation axis set at the position of the eyepiece window in a case of using the eyepiece window, and calculates the first blur amount and the second blur amount based on the rotation axis set at the same position as the optical axis in a case of not using the eyepiece window.

7. The image blur correction device according to claim 2, wherein the processor calculates the first blur amount and the second blur amount based on the rotation axis present at the same position as the optical axis in a case in which a posture of the imaging apparatus when the imaging is performed is unknown.

8. The image blur correction device according to claim 2, wherein the processor calculates the first blur amount and the second blur amount based on the rotation axis present at the same position as the optical axis in a case where the imaging apparatus is set in a motion picture imaging mode.

9. The image blur correction device according to claim 2, wherein the imaging apparatus comprises a display provided on surface opposite to the imaging optical system, and a touch panel formed on the display, and the processor calculates the first blur amount and the second blur amount based on the rotation axis set at a center position of the display in a case in which the imaging is performed by using the touch panel.

10. The image blur correction device according to claim 2, wherein the imaging apparatus comprises a display provided on surface opposite to the imaging optical system and a grip sensor detecting that the imaging apparatus is gripped, and in a case in which the grip sensor detects that the imaging apparatus is gripped, the processor calculates the first blur amount and the second blur amount based on the rotation axis set at a center position of the display.

11. The image blur correction device according to claim 10, wherein the processor calculates the first blur amount and the second blur amount based on the rotation axis set at the center position in a case where the imaging apparatus is set in a motion picture imaging mode.

12. An imaging apparatus comprising:
the image blur correction device according to claim 1; and
the image sensor.

13. An image blur correction method of correcting a blur of an imaging apparatus that includes an image sensor which images a subject through an imaging optical system, the method comprising:

a radius-of-gyration calculation step of calculating a first radius of gyration of an imaging apparatus around a first axis based on a first acceleration and a first angular velocity detected by an acceleration sensor that detects the first acceleration in one direction of two directions which are orthogonal to an optical axis of the imaging optical system of the imaging apparatus and are orthogonal to each other and a second acceleration in the other direction of the two directions and an angular velocity sensor that detects the first angular velocity of the imaging apparatus around the first axis parallel to the other direction and a second angular velocity of the imaging apparatus around a second axis parallel to the one direction, and calculating a second radius of gyration of the imaging apparatus around the second axis based on the second acceleration and the second angular velocity; and a correction step of calculating a first blur amount of the captured image signal in the one direction generated by rotation of the imaging apparatus around the first axis based on the first angular velocity and at least one of the first radius of gyration or the second radius of gyration, calculating a second blur amount of the captured image signal in the other direction generated by rotation of the imaging apparatus around the second axis based on the second angular velocity and at least one of the first radius of gyration or the second radius of gyration, and correcting the calculated first blur amount and the calculated second blur amount, wherein, in the correction step, the blur is corrected based on a member of the imaging apparatus that is used for an imaging of the imaging apparatus.

14. The image blur correction method according to claim 13, wherein a position of a rotation axis that is parallel to the optical axis is determined, and the first radius of gyration and the second radius of gyration used in calculating the first blur amount and the second blur amount is determined based on distances in the two directions from the selected rotation axis to the acceleration sensor.

15. The image blur correction method according to claim 14, wherein, in the correction step, in a case where a difference between a first distance in the one direction from the rotation axis to the acceleration sensor and a second distance in the other direction from the selected rotation axis to the acceleration sensor is equal to or greater than a predetermined value and the first distance is greater than the second distance, the first blur amount is calculated based on the first angular velocity and the first radius of gyration, and the second blur amount is calculated based on the second angular velocity and the first radius of gyration.

16. The image blur correction method according to claim 15, wherein, in the correction step, in a case where the difference is equal to or greater than the predetermined value and the first distance is less than the second distance, the first blur amount is calculated based on the first angular velocity and the second radius of gyration, and the second blur amount is calculated based on the second angular velocity and the second radius of gyration.

17. The image blur correction method according to claim 15, wherein, in the correction step, in a case where the difference is less than the predetermined value, the first blur amount is calculated based on the first angular velocity and the second radius of gyration, and the second blur amount is calculated based on the second angular velocity and the first radius of gyration.

18. The image blur correction method according to claim 14, wherein the imaging apparatus comprises an eyepiece window for observing the subject, and in the correction step, the first blur amount and the second blur amount are calculated based on the rotation axis set at the position of the eyepiece window in a case of using the eyepiece window, and the first blur amount and the second blur amount are calculated based on the rotation axis set at the same position as the optical axis in a case of not using the eyepiece window.

19. The image blur correction method according to claim 14, wherein in the correction step, the first blur amount and the second blur amount are calculated based on the rotation axis present at the same position as the optical axis is selected in a case in which a posture of the imaging apparatus when the imaging is performed is unknown.

20. The image blur correction method according to claim 14, wherein in the correction step, the first blur amount and the second blur amount are calculated based on the rotation axis present at the same position as the optical axis in a case where the imaging apparatus is set in a motion picture imaging mode.

21. The image blur correction method according to claim 14, wherein the imaging apparatus comprises a display provided on surface opposite to the imaging optical system, and a touch panel formed on the display, and in the correction step, the first blur amount and the second blur amount are calculated based on the rotation axis set at the center position in a case in which imaging is performed by operating the touch panel.

22. The image blur correction method according to claim 14, wherein the imaging apparatus comprises a display provided on surface opposite to the imaging optical system, and a grip sensor detecting that the imaging apparatus is gripped, and in the correction step, the first blur amount and the second blur amount are calculated based on the rotation axis set at a center position of the display is selected in a case in which the grip sensor detects that the imaging apparatus is gripped.

23. An image blur correction device configured to correct a blur of an imaging apparatus that includes an image sensor which images a subject through an imaging optical system, a first member that is used for an imaging of the imaging apparatus and a second member that is used for the imaging, the device comprising:

an acceleration sensor that detects a first acceleration in one direction of two directions which are orthogonal to an optical axis of the imaging optical system of the imaging apparatus and are orthogonal to each other and a second acceleration in the other direction of the two directions;

an angular velocity sensor that detects a first angular velocity of the imaging apparatus around a first axis parallel to the other direction and a second angular velocity of the imaging apparatus around a second axis parallel to the one direction; and a processor configured to calculate a first radius of gyration of the imaging apparatus around the first axis based on the first acceleration and the first angular velocity and a second radius of gyration of the imaging apparatus around the second axis based on the second acceleration and the second angular velocity and calculate a first blur amount of the captured image signal in the one direction generated by rotation of the imaging apparatus around the first axis based on the first angular velocity and at least one of the first radius of gyration or the second radius of gyration, calculates a second blur amount of the captured image signal in the other direction generated by rotation of the imaging apparatus around the second axis based on the second angular velocity and at least one of the first radius of gyration or the second radius of gyration, and corrects the calculated first blur amount and the calculated second blur amount, wherein the processor changes method of calculating the first blur amount and the second blur amount depending on whether the imaging is performed by using the first member or the second member.

24. A non-transitory computer readable medium storing an image blur correction program for correcting a blur of an imaging apparatus that includes an image sensor which images a subject through an imaging optical system, the program causing a computer to execute:

a radius-of-gyration calculation step of calculating a first radius of gyration of an imaging apparatus around a first axis based on a first acceleration and a first angular velocity detected by an acceleration sensor that detects the first acceleration in one direction of two directions which are orthogonal to an optical axis of the imaging optical system of the imaging apparatus and are orthogonal to each other and a second acceleration in the other direction of the two directions and an angular velocity sensor that detects the first angular velocity of the imaging apparatus around the first axis parallel to the other direction and a second angular velocity of the imaging apparatus around a second axis parallel to the one direction, and calculating a second radius of gyration of the imaging apparatus around the second axis based on the second acceleration and the second angular velocity; and a correction step of calculating a first blur amount of the captured image signal in the one direction generated by rotation of the imaging apparatus around the first axis based on the first angular velocity and at least one of the first radius of gyration or the second radius of gyration, calculating a second blur amount of the captured image signal in the other direction generated by rotation of the imaging apparatus around the second axis based on the second angular velocity and at least one of the first radius of gyration or the second radius of gyration, and correcting the calculated first blur amount and the calculated second blur amount, wherein, in the correction step, the blur is corrected based on a member of the imaging apparatus that is used for an imaging of the imaging apparatus.

* * * * *